United States Patent
Iwasaki

(10) Patent No.: US 10,128,696 B2
(45) Date of Patent: Nov. 13, 2018

(54) WIRELESS POWER RECEIVING APPARATUS

(71) Applicant: ROHM CO., LTD., Ukyo-Ku, Kyoto (JP)

(72) Inventor: Tatsuya Iwasaki, Kyoto (JP)

(73) Assignee: ROHM CO., LTD., Kyoto (JP)

(*) Notice: Subject to any disclaimer, the term of this patent is extended or adjusted under 35 U.S.C. 154(b) by 9 days.

(21) Appl. No.: 15/228,267

(22) Filed: Aug. 4, 2016

(65) Prior Publication Data

US 2016/0352155 A1   Dec. 1, 2016

Related U.S. Application Data

(63) Continuation of application No. PCT/JP2015/051858, filed on Jan. 23, 2015.

(30) Foreign Application Priority Data

Feb. 10, 2014 (JP) .................................. 2014-023677
May 29, 2014 (JP) .................................. 2014-111526

(51) Int. Cl.
*H02J 7/02* (2016.01)
*H04B 5/00* (2006.01)
(Continued)

(52) U.S. Cl.
CPC ............. *H02J 50/60* (2016.02); *H02J 5/005* (2013.01); *H02J 7/025* (2013.01); *H02J 50/10* (2016.02); *H02J 50/12* (2016.02); *H02J 50/80* (2016.02)

(58) Field of Classification Search
CPC .. H02J 5/005; H02J 7/025; H02J 50/10; H02J 50/12; H02J 50/60; H02J 50/80;
(Continued)

(56) References Cited

U.S. PATENT DOCUMENTS

2002/0056233 A1   5/2002   Gohara
2011/0316553 A1   12/2011  Taguchi et al.
(Continued)

FOREIGN PATENT DOCUMENTS

CN   102928809 A   2/2013
CN   103675492 A   3/2014
(Continued)

OTHER PUBLICATIONS

International Search Report corresponding to Application No. PCT/JP2015/051858; dated Apr. 7, 2015, with English translation.
(Continued)

*Primary Examiner* — Hal Kaplan
(74) *Attorney, Agent, or Firm* — Cantor Colburn LLP

(57) ABSTRACT

A control circuit is employed for controlling a wireless power receiving apparatus that receives an electric power signal from a wireless power transmission apparatus. An electric power detection unit detects the received electric power $P_{RX}$ received by the wireless power receiving apparatus. A control unit generates a control signal CE for controlling the electric power $P_{TX}$ to be transmitted by the wireless power transmission apparatus. When the received electric power $P_{RX}$ detected by the electric power detection unit falls despite the control signal CE not indicating an instruction to lower the electric power $P_{TX}$ to be transmitted, an abnormal state judgment unit judges that an abnormal state has occurred.

19 Claims, 14 Drawing Sheets

(51) Int. Cl.
  *H02J 50/60* (2016.01)
  *H02J 50/80* (2016.01)
  *H02J 50/12* (2016.01)
  *H02J 5/00* (2016.01)
  *H02J 50/10* (2016.01)

(58) Field of Classification Search
  CPC .................... H02J 17/00; H01F 38/14; H04B 5/0025–5/0093
  USPC .......................................... 307/104; 320/108
  See application file for complete search history.

(56) References Cited

U.S. PATENT DOCUMENTS

2014/0106687 A1* 4/2014 Allgaier .................. H01F 38/14 455/90.2
2014/0139036 A1* 5/2014 Shijo ....................... H02J 17/00 307/104

FOREIGN PATENT DOCUMENTS

| EP | 2755301 A1 | 7/2014 |
|---|---|---|
| JP | 2012029528 A | 2/2012 |
| JP | 5071574 B1 | 11/2012 |
| JP | 2013017336 A | 1/2013 |
| JP | 2013038854 A | 2/2013 |
| JP | 2013198379 A | 9/2013 |
| JP | 2014018061 A | 1/2014 |

OTHER PUBLICATIONS

Written Opinion of the International Searching Authority corresponding to Application No. PCT/JP2015/051858; dated Apr. 7, 2015, with English translation.

"The Qi wireless power transfer system power class 0 specification—Parts 1 and 2: Interface Definitions" International Electrotechnical Commission; 2017, pp. 1-160, Edition 1.0.

Extended European Search Report for corresponding EP Application No. 15745974.4.-1804/3107188 PCT/JP2015051858; dated Aug. 29, 2017.

JP Notification of Reasons for Refusal corresponding to Application No. 2014-111526; Dated Mar. 27, 2018.

SIPO First Office Action corresponding to Application No. 201580003832.1; dated Apr. 3, 2018.

European Office Action corresponding to Application No. 15745974A; dated Jun. 29, 2018.

* cited by examiner (a)

WIRELESS POWER RECEIVING APPARATUS

CROSS-REFERENCE TO RELATED APPLICATIONS

This application is a continuation under 35 U.S.C. § 120 of PCT/JP2015/051858, filed Jan. 23, 2015, which is incorporated herein reference and which claimed priority to Japanese Application No. 2014-023677, filed Feb. 10, 2014 and Japanese Application No. 2014-111526, filed May 29, 2014. The present application likewise claims priority under 35 U.S.C. § 119 to Japanese Application No. 2014-023677, filed Feb. 10, 2014 and Japanese Application No. 2014-111526, filed May 29, 2014, the entire content of which is also incorporated herein by reference.

BACKGROUND OF THE INVENTION

1. Field of the Invention

The present invention relates to a wireless power supply technique, and particularly to a foreign object detection technique.

2. Description of the Related Art

In recent years, in order to supply electric power to an electronic device, contactless power transmission (which is also referred to as "contactless power supply" or "wireless power supply") has begun to come into commonplace use. In order to advance the compatibility of products between manufacturers, the WPC (Wireless Power Consortium) has been organized, and the WPC has developed the Qi standard as an international standard.

The wireless power supply that conforms to the Qi standard uses electromagnetic induction between a transmission coil and a reception coil. A power supply system is configured including a power supply apparatus having a power transmission coil and a power receiver terminal having a reception coil.

FIG. 1 is a diagram showing a configuration of a wireless power supply system 10 that conforms to the Qi standard. The power supply system 10 includes a power transmission apparatus 20 (TX: power transmitter) and a power receiving apparatus 30 (RX: power receiver). The power receiving apparatus 30 is mounted on an electronic device, examples of which include cellular phone terminals, smartphones, audio players, game machines, and tablet terminals.

The power transmission apparatus 20 includes a transmission coil (primary coil) 22, a driver 24, a controller 26, and a demodulator 28. The driver 24 includes an H-bridge circuit (full-bridge circuit) or otherwise a half-bridge circuit. The driver 24 applies a driving signal S1, specifically, in the form of a pulse signal, to the transmission coil 22. This provides a driving current flowing through the transmission coil 22, which generates an electric power signal S2 at the transmission coil 22 in the form of an electromagnetic signal. The controller 26 integrally controls the overall operation of the power transmission apparatus 20. Specifically, the controller 26 controls the switching frequency of the driver 24 or otherwise the duty ratio of the switching of the driver 24 so as to adjust the electric power to be transmitted.

In the Qi standard, a protocol is defined for communication between the power transmission apparatus 20 and the power receiving apparatus 30, which enables information transmission from the power receiving apparatus 30 to the power transmission apparatus 20 via a control signal S3. The control signal S3 is transmitted from a reception coil 32 (secondary coil) to the transmission coil 22 in the form of an AM (Amplitude Modulation) modulated signal using backscatter modulation. The control signal S3 includes electric power control data (which will also be referred to as a "packet") which controls an amount of electric power to be supplied to the power receiving apparatus 30, and data which indicates the particular information for identifying the power receiving apparatus 30. The demodulator 28 demodulates the control signal S3 included in the current or otherwise the voltage applied to the transmission coil 22. The controller 26 controls the driver 24 based on the power control data included in the control signal S3 thus demodulated.

The power receiving apparatus 30 includes the reception coil 32, a rectifier circuit 34, a smoothing capacitor 36, a modulator 38, a load 40, a controller 42, and a power supply circuit 44. The reception coil 32 receives the electric power signal S2 from the transmission coil 22, and transmits the control signal S3 to the transmission coil 22. The rectifier circuit 34 and the smoothing capacitor 36 rectify and smooth a current S4 induced at the reception coil 32 according to the electric power signal S2, thereby converting the current S4 into a DC voltage.

Using electric power supplied from the power transmission apparatus 20, the power supply circuit 44 charges an unshown secondary battery or steps up or otherwise steps down the DC voltage $V_{RECT}$, so as to supply the DC voltage to the controller 42 or other circuits such as the load 40.

The controller 42 monitors the amount of electric power supplied to the load 40, and accordingly generates electric power control data which controls the electric power to be transmitted from the power transmission apparatus 20. The modulator 38 modulates the control signal S3 including the electric power control data so as to modulate the coil current that flows through the reception coil 32, thereby modulating the coil current and coil voltage applied to the transmission coil 22.

With the power supply system 10, the power transmission apparatus 20 and a power receiver terminal (electronic device) are located within a space with a relatively high degree of freedom. Thus, it is conceivable that a state can occur in which there is an electro-conductive foreign object such as a piece of metal or the like between, or otherwise in the vicinity of, the transmission coil 22 and the reception coil 32. In a case in which wireless power supply is performed in such a state, a current flows through such a foreign object, leading to a problem of power loss. Also, this leads to a problem of the foreign object heating up. In view of such a situation, foreign object detection (FOD) has been designed in the WPC1.1 (System Description Wireless Power Transfer Volume I: Low Power Part 1: Interface Definition Version 1.1) specification.

In such FOD, the electric power transmitted by the power transmission apparatus 20 is compared with the electric power received by the power receiving apparatus 30. When the difference between them is greater than an allowable value, judgment is made that an abnormal state is present.

SUMMARY OF THE INVENTION

The present invention has been made in order to solve such a problem. Accordingly, it is an exemplary purpose of an embodiment of the present invention to provide a power receiving apparatus that is capable of detecting an abnormal state by itself.

An embodiment of the present invention relates to a control circuit employed for a wireless power receiving apparatus that receives an electric power signal from a wireless power transmission apparatus. The control circuit comprises: an electric power detection unit that detects a received electric power received by the wireless power receiving apparatus; a control unit that generates a control signal for controlling a transmitted electric power to be transmitted from the wireless power transmission apparatus; and an abnormal state judgment unit that judges whether or not an abnormal state has occurred, based on the received electric power detected by the electric power detection unit and a past state of the wireless power receiving apparatus.

The electric power transmitted from the wireless power transmission apparatus is changed according to the control signal (control error packet) transmitted from the wireless power receiving apparatus. Thus, it can be said that the power receiving apparatus has information with respect to the level of electric power to be received by the power receiving apparatus itself. Accordingly, the wireless power receiving apparatus is able to detect an abnormal state based on the past state of the wireless power receiving apparatus itself and the actually received electric power. Such an embodiment does not require a comparison between the transmitted electric power measured by the power transmission apparatus and the received electric power measured by the power receiving apparatus. Thus, such an arrangement allows the power receiving apparatus to detect an abnormal state with the detection precision of the power receiving apparatus itself.

Also, when the received electric power detected by the electric power detection unit falls despite the control signal not indicating an instruction to lower the electric power to be transmitted, the abnormal state judgment unit may judge that an abnormal state has occurred.

When the received electric power detected by the electric power detection unit falls although the power receiving apparatus does not transmit an instruction to lower the electric power to be transmitted, it can be considered that a certain abnormal state such as the introduction of a foreign object, misalignment between the transmission coil and the reception coil, or the like, has occurred.

In other words, when the received electric power detected by the electric power detection unit does not rise despite the control signal indicating an instruction to raise the electric power to be transmitted, the abnormal state judgment unit judges that an abnormal state has occurred.

With an embodiment, the abnormal state judgment unit may set a threshold value based on past data of the received electric power detected by the electric power detection unit in a period in which judgment was made that a normal operation was being performed. Also, the abnormal state judgment unit may judge whether or not an abnormal state has occurred, based on a comparison result between the threshold value and the received electric power detected by the electric power detection unit in a current stage.

With an arrangement in which a foreign object is detected based on the received electric power and the transmitted electric power, such an arrangement requires high precision in the measurement of both the absolute value of the transmitted electric power and the absolute value of the received electric power. In contrast, the present embodiment requires high precision in only the measurement of the relative value of the received electric power, thereby dramatically facilitating the system design.

Also, the abnormal state judgment unit may set the threshold value based on past data of the received electric power detected by the electric power detection unit multiple times or otherwise for a predetermined period of time in a period in which judgment was made that a normal operation was being performed.

This removes the effects of noise or the like, thereby allowing the abnormal state detection to be performed in a stable manner.

Also, the abnormal state judgment unit may set the threshold value to a value obtained by subtracting a predetermined allowable difference from the received electric power detected in a period in which judgment was made that a normal operation was being performed.

With such an arrangement, when the difference between the received electric power detected in the normal state and the received electric power detected by the electric power detection unit in the current stage exceeds an allowable difference, judgment may be made that an abnormal state has occurred. Such an arrangement allows the sensitivity of the abnormal state detection to be adjusted according to the allowable difference.

Also, the abnormal state judgment unit may calculate an expected value of the received electric power to be received by the wireless power receiving apparatus. Also, the abnormal state judgment unit may judge whether or not an abnormal state has occurred, based on the expected value and the received electric power detected by the electric power detection unit in a current stage.

Also, when a difference between the received electric power detected by the electric power detection unit in a current stage and the expected value exceeds a predetermined allowable difference, the abnormal state judgment unit may judge that an abnormal state has occurred.

Also, the allowable difference may be configured such that it can be set via an external circuit.

Also, the control circuit may further comprise a communication unit that transmits, to the wireless power transmission apparatus, the control signal and data that indicates a detection value of the received electric power. Also, when the abnormal state judgment unit has judged that an abnormal state has occurred, the communication unit may transmit data that instructs the wireless power transmission apparatus to suspend a power supply operation.

Also, the control circuit may further comprise a communication unit that transmits, to the wireless power transmission apparatus, the control signal and data that indicates a detection value of the received electric power. Also, the abnormal state judgment unit may be configured to judge, for every first period, whether or not an abnormal state is present. Also, the communication unit may be configured to transmit data that indicates a detection value of the received electric power to the wireless power transmission apparatus for every second period, which is longer than the first period.

With such an arrangement, the wireless power transmission apparatus is capable of performing the abnormal state detection for every second period based on the comparison between the data that indicates the detection value of the received electric power and the transmitted electric power measured by the wireless power transmission apparatus. That is to say, such an arrangement is capable of employing both the abnormal state detection provided by the wireless power receiving apparatus and the foreign object detection provided by the wireless power transmission apparatus.

Also, when the abnormal state judgment unit judges that an abnormal state has occurred, the communication unit may transmit data that indicates a detection value of the received electric power to the wireless power transmission apparatus.

This allows the wireless power transmission apparatus to start its foreign object detection with the abnormal state detection obtained by the wireless power receiving apparatus functioning as a trigger. Such an arrangement provides the foreign object detection with improved detection speed and/or improved precision.

Also, the control circuit may further comprise a communication unit that transmits, to the wireless power transmission apparatus, the control signal and data that indicates a detection value of the received electric power. Also, when the abnormal state judgment unit judges that an abnormal state has occurred, the communication unit transmits data that instructs the wireless power transmission apparatus to perform foreign object detection.

Also, the control circuit may conform to the Qi standard.

Also, the control circuit may be monolithically integrated on a single semiconductor substrate.

Examples of such a "monolithically integrated" arrangement include: an arrangement in which all the circuit components are formed on a semiconductor substrate; and an arrangement in which principal circuit components are monolithically integrated. Also, a part of the circuit components such as resistors and capacitors may be arranged in the form of components external to such a semiconductor substrate in order to adjust the circuit constants. By monolithically integrating the circuit as a single IC (Integrated Circuit), such an arrangement allows the circuit area to be reduced, and allows the circuit elements to have uniform characteristics.

Another embodiment of the present invention relates to a wireless power receiving apparatus. The wireless power receiving apparatus comprises: a reception antenna comprising a reception coil so as to receive the electric power signal; a rectifier circuit that rectifies a current that flows through the reception coil; a smoothing capacitor that is connected to an output of the rectifier circuit, so as to generate a rectified voltage $V_{RECT}$; and any one of the aforementioned control circuits.

Yet another embodiment of the present invention relates to an electronic device. The electronic device comprises: a reception antenna comprising a reception coil so as to receive the electric power signal; a rectifier circuit that rectifies a current that flows through the reception coil; a smoothing capacitor that is connected to an output of the rectifier circuit, so as to generate a rectified voltage $V_{RECT}$; and any one of the aforementioned control circuits.

It should be noted that any combination of the aforementioned components, any component of the present invention, or any manifestation thereof, may be mutually substituted between a method, apparatus, system, and so forth, which are also effective as an embodiment of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
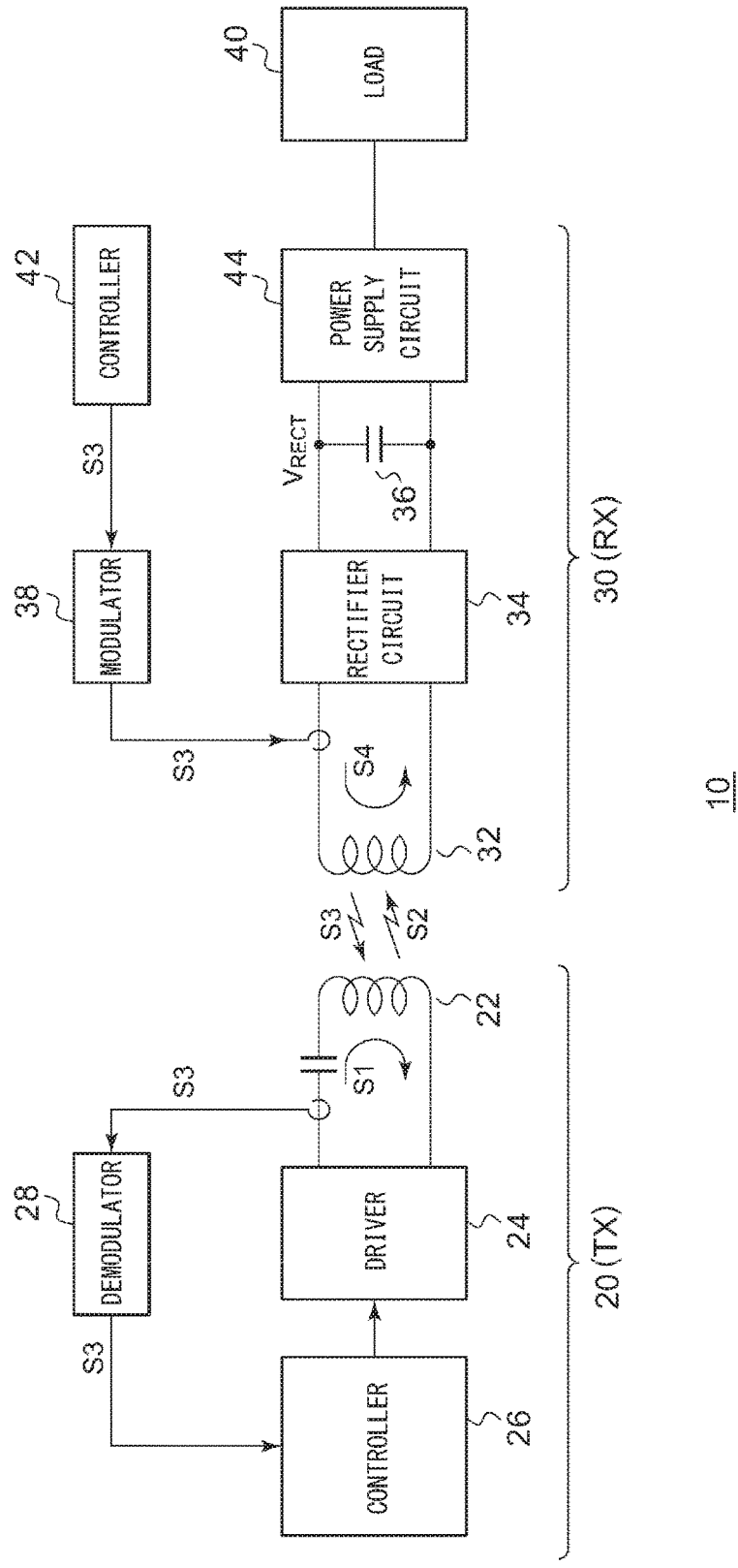
FIG. 1 is a diagram showing a configuration of a wireless power supply system that conforms to the Qi standard.

Description will be made below regarding preferred embodiments according to the present invention with reference to the drawings. The same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

In the present specification, the state represented by the phrase "the member A is connected to the member B" includes a state in which the member A is indirectly connected to the member B via another member that does not substantially affect the electric connection therebetween, or that does not damage the functions or effects of the connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not substantially affect the electric connection therebetween, or that does not damage the functions or effects of the connection therebetween, in addition to a state in which the member A is directly connected to the member C, or the member B is directly connected to the member C.

Figure 2:
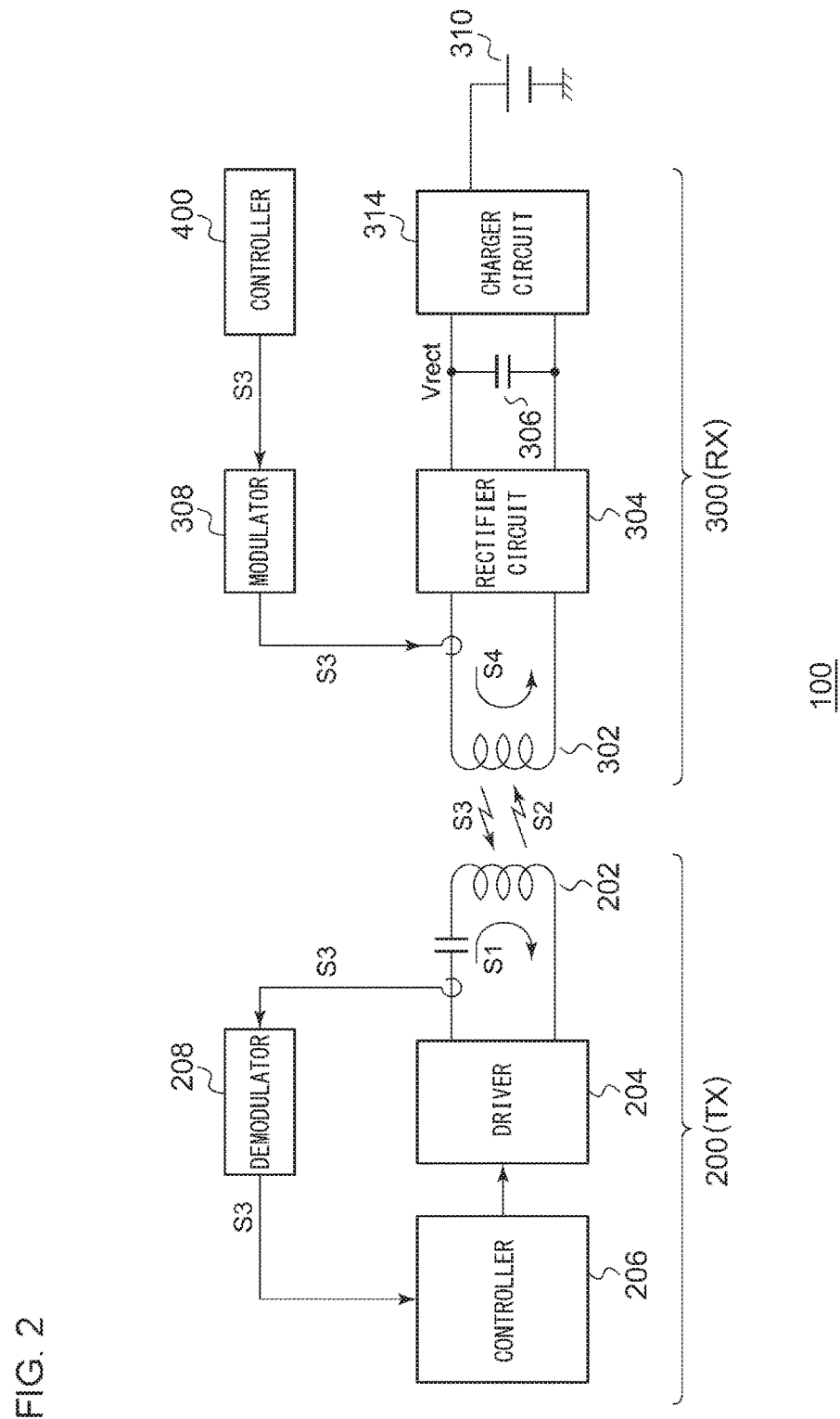
FIG. 2 is a diagram showing a configuration of a wireless power supply system according to an embodiment.

FIG. 2 is a diagram showing a configuration of a wireless power supply system according to an embodiment. A power supply system 100 includes a power transmission apparatus 200 (TX: power transmitter) and a power receiving apparatus 300 (RX: power receiver). The power receiving apparatus 300 is mounted on an electronic device, examples of which include cellular phone terminals, smartphones, audio players, game machines, and tablet terminals.

The power transmission apparatus 200 includes a transmission coil (primary coil) 202, a driver 204, a controller 206, and a demodulator 208. The driver 204 includes an H-bridge circuit (full-bridge circuit) or otherwise a half-bridge circuit. The driver 204 applies a driving signal S1, specifically, in the form of a pulse signal, to the transmission coil 202. This provides a driving current flowing through the transmission coil 202, which generates an electric power signal S2 at the transmission coil 202 in the form of an electromagnetic signal. The controller 206 integrally controls the overall operation of the power transmission apparatus 200. Specifically, the controller 206 controls the switching frequency of the driver 204 or otherwise the duty ratio of the switching of the driver 204 so as to adjust the electric power to be transmitted.

In the Qi standard, a protocol is defined for communication between the power transmission apparatus 200 and the power receiving apparatus 300, which enables information transmission from the power receiving apparatus 300 to the power transmission apparatus 200 via a control signal S3. The control signal S3 is transmitted from a reception coil 302 (secondary coil) to the transmission coil 202 in the form of an AM (Amplitude Modulation) modulated signal using backscatter modulation. The control signal S3 includes electric power control data (which will also be referred to as a "packet") which controls an amount of electric power to be supplied to the power receiving apparatus 300, and data which indicates the particular information for identifying the power receiving apparatus 300. The demodulator 208 demodulates the control signal S3 included in the current or otherwise the voltage applied to the transmission coil 202. The controller 206 controls the driver 204 based on the power control data included in the control signal S3 thus demodulated.

The power receiving apparatus 300 includes the reception coil 302, a rectifier circuit 304, a smoothing capacitor 306, a modulator 308, a load 310, a control circuit 400, and a power supply circuit 314. The reception coil 302 receives the electric power signal S2 from the transmission coil 202, and transmits the control signal S3 to the transmission coil 202. The rectifier circuit 304 and the smoothing capacitor 306 rectify and smooth a current S4 induced at the reception coil 302 according to the electric power signal S2, thereby converting the electric power signal S2 into a DC voltage.

Using electric power supplied from the power transmission apparatus 200, the power supply circuit 314 charges an unshown secondary battery or steps up or otherwise steps down the DC voltage $V_{RECT}$, so as to supply the DC voltage to the control circuit 400 or other circuits such as the load 310.

The control circuit 400 monitors the electric power supplied to the load 310, and accordingly generates electric power control data which controls the amount of electric power to be transmitted from the power transmission apparatus 200. The modulator 308 modulates the control signal S3 including the electric power control data so as to modulate the coil current that flows through the reception coil 302, thereby modulating the coil current and coil voltage applied to the transmission coil 202.

With the power supply system 100, the power transmission apparatus 200 and a power receiver terminal (electronic device) are located within a space with a relatively high degree of freedom. Thus, it is conceivable that a state can occur in which there is an electro-conductive foreign object such as a piece of metal or the like between, or otherwise in the vicinity of, the transmission coil 202 and the reception coil 302. In a case in which wireless power supply is performed in this state, a current flows through the foreign object, leading to power loss. Also, such a case leads to a problem of the foreign object heating up. In view of such a situation, foreign object detection (FOD) has been designed in the WPC1.1 (System Description Wireless Power Transfer Volume I: Low Power Part 1: Interface Definition Version 1.1) specification.

With such FOD, the electric power transmitted by the power transmission apparatus 200 is compared with the electric power received by the power receiving apparatus 300. When the difference between them exceeds an allowable value, judgment is made that there is a foreign object. In addition, the power receiving apparatus 300 according to the present embodiment is further provided with another judgment mechanism for detecting a foreign object.

Figure 3:
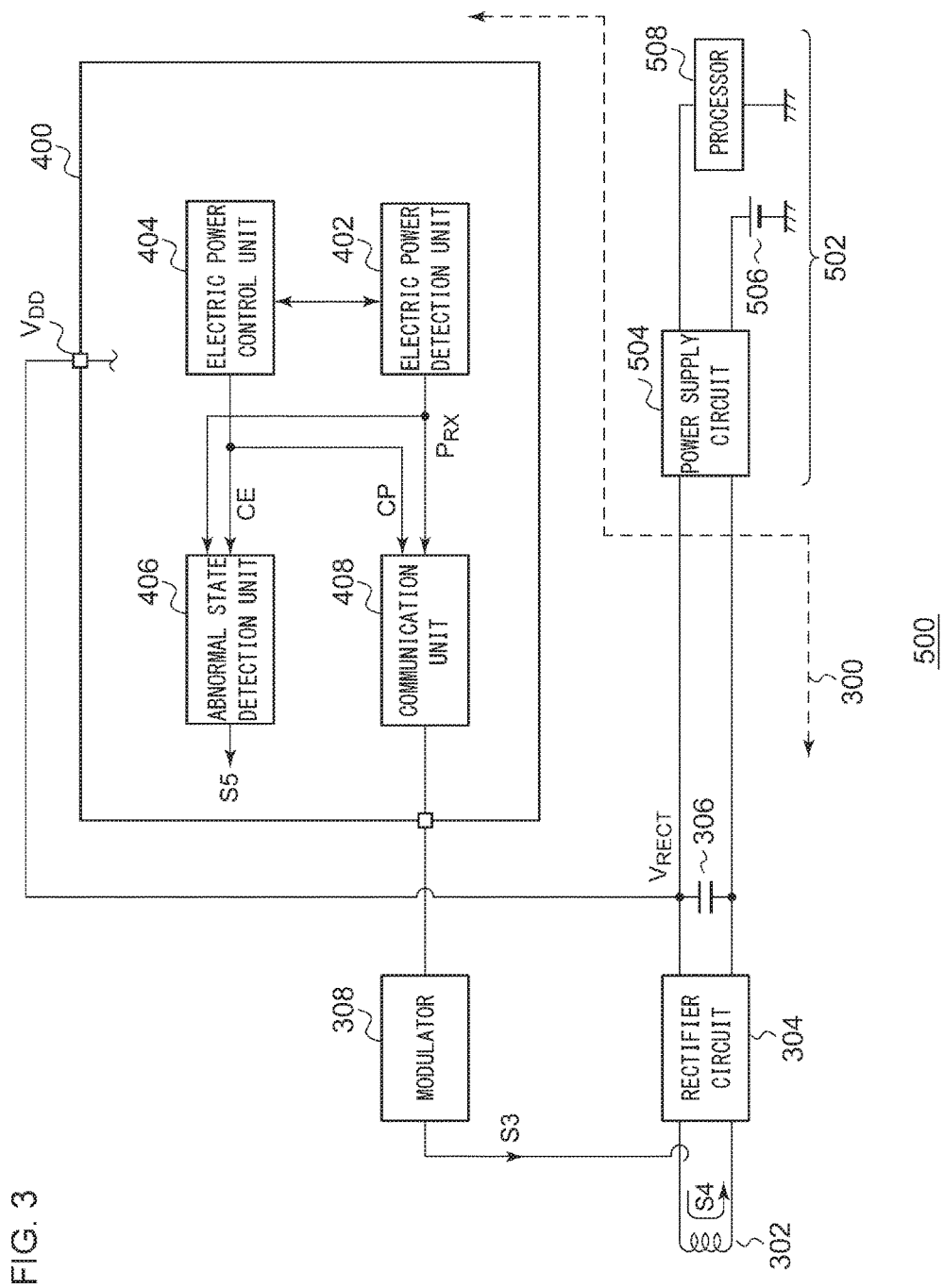
FIG. 3 is a block diagram showing an electronic device including a power receiving apparatus of the wireless power supply system according to the embodiment.

FIG. 3 is a block diagram showing an electronic device 500 including the power receiving apparatus 300 according to an embodiment. The power receiving apparatus 300 receives the electric power signal S2 from the power transmission apparatus 200, stores the electric power signal S2 in the form of energy in the smoothing capacitor 306, and supplies the electric power to a load 502. The load 502 includes a power supply circuit 504, a secondary battery 506, and a desired kind of processor 508.

The power receiving apparatus 300 includes the reception coil 302, the smoothing capacitor 306, the modulator 308, and the control circuit 400. The power receiving apparatus 300 shown in FIG. 3 is employed in the power supply system 100 that conforms to the Qi standard as shown in FIG. 2.

The reception coil 302 receives the electric power signal S2 from the transmission coil 202. Furthermore, the reception coil 302 transmits the control signal S3 to the transmission coil 202. The rectifier circuit 304 and the smoothing capacitor 306 rectify and smooth the current S4 induced at the reception coil 302 according to the electric power signal S2, thereby converting the electric power signal S2 into a DC voltage $V_{RECT}$.

The power supply circuit 504 includes: a charger circuit that charges the secondary battery 506 using the electric power supplied from the power transmission apparatus 200; and/or a DC/DC converter that steps up or otherwise steps down the DC voltage $V_{RECT}$, and that supplies the DC voltage thus stepped up or otherwise stepped down to the processor 508.

The control circuit 400 includes an electric power detection unit 402, a control unit 404, an abnormal state judgment unit 406, and a communication unit 408, which are monolithically integrated on a single semiconductor substrate.

The electric power detection unit 402 detects received electric power $P_{RX}$ received by the wireless power receiving apparatus 300. The detection algorithm used to detect the received electric power $P_{RX}$ is not restricted in particular. The received electric power $P_{RX}$ may be detected based on the following Expression (1), for example.

$$P_{RX} = V_{RECT} \times I_{LOAD} + R_{ON} \times I_{LOAD}^2 + V_{DD} \times I_{DD}$$

The first term on the right-hand side $V_{RECT} \times I_{LOAD}$ represents the electric power consumed by the load 502. Here, $I_{LOAD}$ represents a current that flows from the smoothing capacitor 306 to the power supply circuit 504.

The second term on the right-hand side $R_{ON} \times I_{LOAD}^2$ represents the power loss. Here, $R_{ON}$ represents a predetermined constant having an impedance dimension.

The third term on the right-hand side $V_{DD} \times I_{DD}$ represents the electric power consumption of the control circuit 400. In the present embodiment, the DC voltage $V_{RECT}$ is supplied to the power supply terminal $V_{DD}$ of the control circuit 400. That is to say, the control circuit 400 operates using the rectified voltage $V_{RECT}$ as the power supply voltage. In this case, the relation $V_{DD}=V_{RECT}$ holds true. Here, $I_{DD}$ represents a current that flows through the power supply terminal $V_{DD}$ of the control circuit 400.

The electric power detection unit 402 outputs the electric power detection result to the control unit 404.

The control unit 404 sets a target value of the DC voltage $V_{RECT}$ (which will also be referred to as the "control point CP"). Furthermore, the control unit 404 generates a control signal (which will be referred to as the "control error packet") CE for controlling the electric power $P_{TX}$ to be transmitted by the wireless power transmission apparatus 200. For example, the control unit 404 may generate the control signal CE based on the difference between the DC voltage $V_{RECT}$ across the smoothing capacitor 306 and its target value. Specifically, (i) when the DC voltage $V_{RECT}$ is maintained at its target value in a stable state, the control signal CE may be set to zero. On the other hand, (ii) when the DC voltage $V_{RECT}$ is higher than its target value, the control signal CE may be set to a negative value that corresponds to the difference between them, which functions as an instruction to lower the electric power $P_{TX}$ to be transmitted. Furthermore, when the DC voltage $V_{RECT}$ is lower than its target value, the control signal CE may be set to a positive value that corresponds to the difference between them, which functions as an instruction to raise the electric power $P_{TX}$ to be transmitted. It should be noted that the positive/negative polarity relation thus defined may be reversed.

Furthermore, the control unit 404 outputs a control signal (enable signal) to the electric power detection unit 402, which instructs the electric power detection unit 402 to detect electric power.

The communication unit 408 generates a packet including the control point CP and the control error packet CE, and transmits the packet thus generated to the power transmission apparatus 200 via the modulator 308 and the reception coil 302. The power transmission apparatus 200 adjusts the electric power $P_{TX}$ to be transmitted, based on the control point CP and the control error packet CE thus received.

Furthermore, the communication unit 408 generates a packet that indicates the received electric power $P_{RX}$ detected by the electric power detection unit 402. The communication unit 408 transmits the packet thus generated to the power transmission apparatus 200 via the modulator 308 and the reception coil 302.

The power transmission apparatus 200 has information with respect to the electric power $P_{TX}$ transmitted from the power transmission apparatus 200 itself at the current time to the power receiving apparatus 300. Thus, the power transmission apparatus 200 is able to detect the presence or absence of a foreign object and to detect an abnormal state such as misalignment between the transmission coil and the reception coil, based on the relation between the transmitted electric power $P_{TX}$ and the received electric power $P_{RX}$.

In addition to such an abnormal state detection function provided by the power transmission apparatus 200, the power receiving apparatus 300 is configured to detect an abnormal state by itself with its own precision. Specifically, the power receiving apparatus 300 is capable of detecting an abnormal state without making comparison between the electric power $P_{TX}$ transmitted by the power transmission apparatus 200 and the electric power $P_{RX}$ received by the power receiving apparatus 300. Thus, such an arrangement does not require a concern about both the detection precision of the power transmission apparatus 200 and the detection precision of the power receiving apparatus 300. Specifically, the power receiving apparatus 300 is able to detect such an abnormal state based on its past state and the actually received electric power. Thus, such an arrangement requires a concern about only the detection precision of the power receiving apparatus 300 itself to detect an abnormal state.

The abnormal state judgment unit 406 judges whether or not an abnormal state has occurred, based on the received electric power $P_{RX}$ detected by the electric power detection unit 402 and the past state of the wireless power receiving apparatus 300.

With the present embodiment, the abnormal state judgment unit 406 receives the control signal CE that indicates the electric power $P_{TX}$ to be transmitted and the received electric power $P_{RX}$ detected by the electric power detection unit 402. When the received electric power $P_{RX}$ detected by the electric power detection unit 402 falls although the control signal CE does not indicate an instruction to lower the electric power $P_{TX}$ to be transmitted, the abnormal state judgment unit 406 judges that an abnormal state has occurred. When judgment is made that an abnormal state has occurred, the abnormal state judgment unit 406 asserts (sets to the high level, for example) an abnormal state detection signal S5. The communication unit 408 may receive the abnormal state detection signal S5 thus asserted, and may notify the power transmission apparatus 200 of the occurrence of the abnormal state.

The above is the configuration of the power receiving apparatus 300. Next, description will be made regarding the operation of the power supply system 100.

Figure 4:
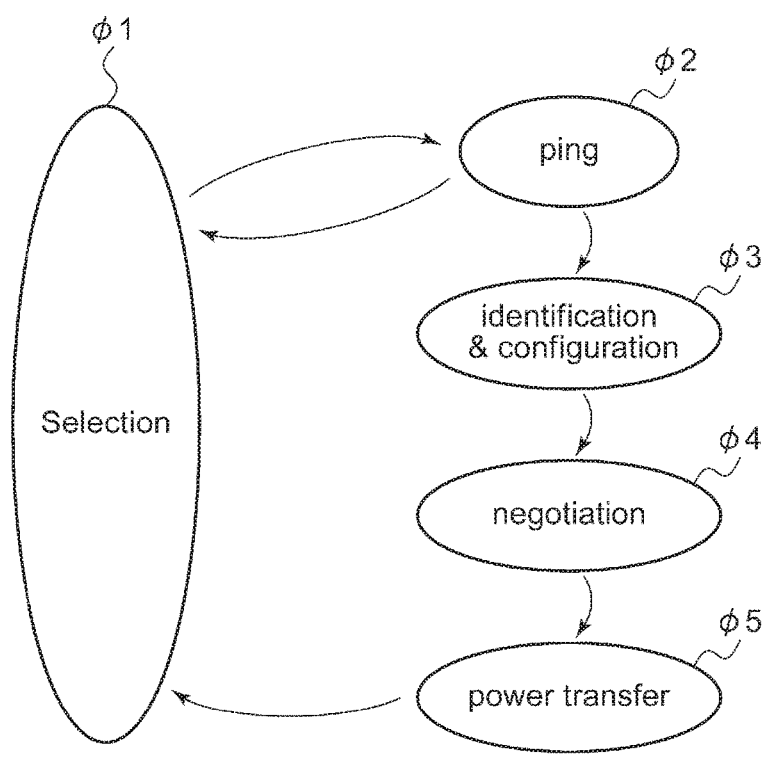
FIG. 4 is a flowchart (state transition diagram) showing an electric power transmission operation that conforms to the Qi standard.

FIG. 4 is a flowchart (state transition diagram) showing the electric power transmission that conforms to the Qi standard. Description will be made below assuming that the following five phases are defined.

ϕ1: Selection phase
ϕ2: Ping phase
ϕ3: Identification and configuration phase
ϕ4: Negotiation phase
ϕ5: Power transfer phase In the selection phase ϕ1, the power receiving apparatus 300 is detected. After the power receiving apparatus 300 is detected, the phase transits to the ping phase ϕ2. In the ping phase ϕ2, the power transmission apparatus 200 executes a digital ping operation, and waits for a response from the power receiving apparatus 300. In the digital ping operation, the transmitted electric power is maintained at a constant level.

In the subsequent identification and configuration phase ϕ3, the power transmission apparatus 200 identifies the power receiving apparatus 300, and configures settings with respect to the electric power to be transmitted or the like.

In the negotiation phase ϕ4, the electric power to be transmitted or the like is reconfigured. In the power transfer phase ϕ5, electric power is transferred based on the information thus configured.

Figure 5:
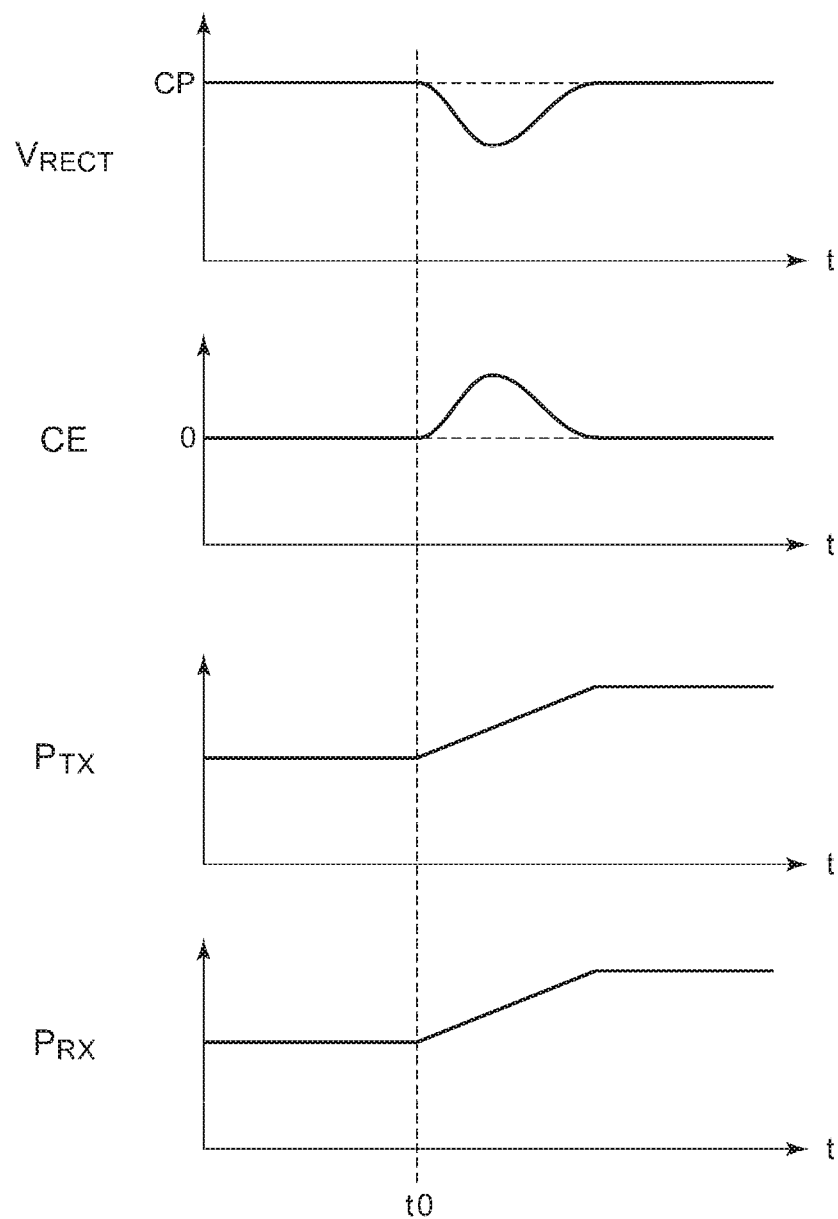
FIG. 5 is an operation waveform diagram showing the operation of the power receiving apparatus in a power transfer phase.
Figure 6:
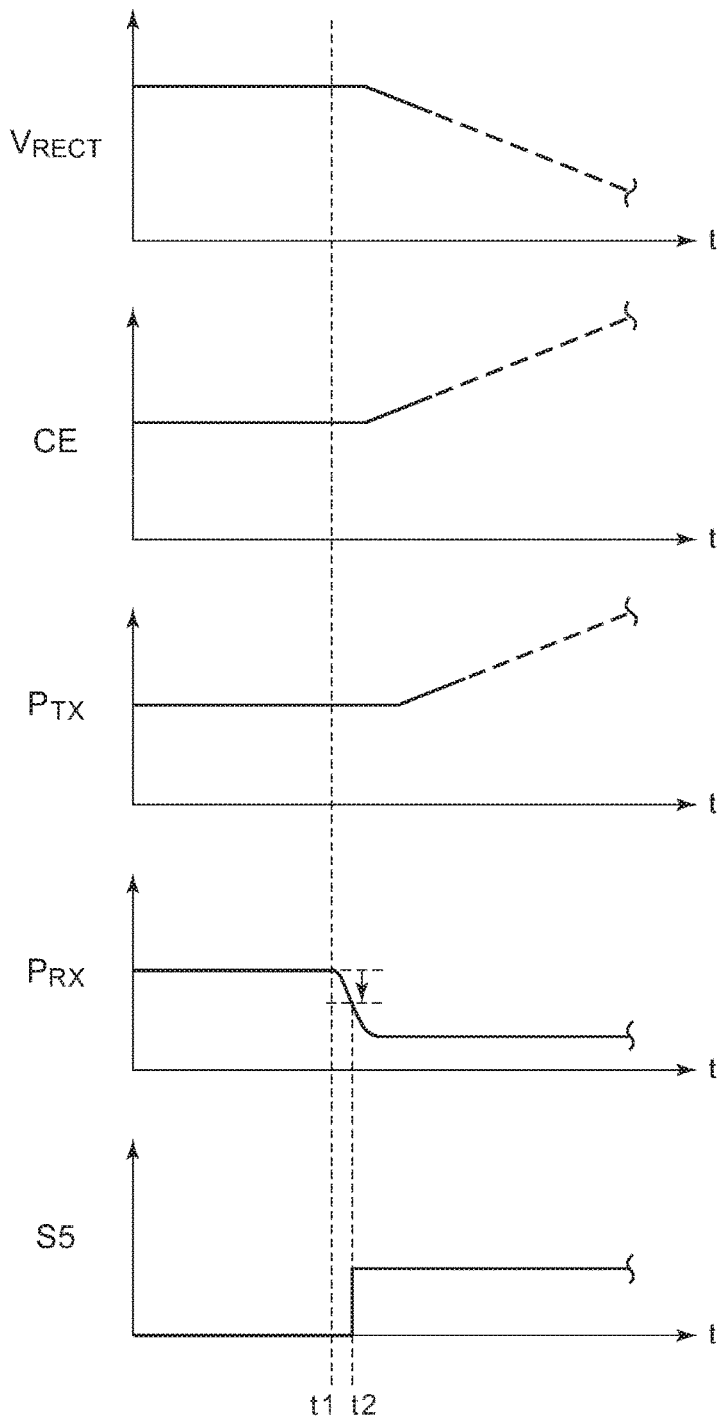
FIG. 6 is an operation waveform diagram showing the operation of the power receiving apparatus in the power transfer phase.

With the power receiving apparatus 300 according to the embodiment, the abnormal state judgment unit 406 is capable of executing the abnormal state judgment in the power transfer phase ϕ5. FIGS. 5 and 6 are operation waveform diagrams each showing the operation of the power receiving apparatus 300 in the power transfer phase ϕ5.

FIG. 5 shows an operation waveform in a normal state. Before the time point t0, electric power is transferred in a stable state, which maintains the DC voltage $V_{RECT}$ at its target value (control point CP). At the time point t1, there is an increase in the load current $I_{LOAD}$ that flows through the power supply circuit 504, which leads to a reduction in the DC voltage $V_{RECT}$. The control error packet CE, which indicates the electric power $P_{TX}$ to be transmitted, is increased according to a reduction in the DC voltage $V_{RECT}$. According to the rise in the control error packet CE, the power transmission apparatus 200 raises the electric power $P_{TX}$ to be transmitted. This increases the received electric power $P_{RX}$ detected by the electric power detection unit 402, according to an increase in the transmitted electric power $P_{TX}$.

Next, description will be made with reference to FIG. 6 regarding the operation in an abnormal state.

Before the time point t0, electric power is transferred in a stable state, which maintains the DC voltage $V_{RECT}$ at its target value (control point CP).

At the time point t1, a foreign object is introduced. After such a foreign object is introduced, a part of the transmitted electric power $P_{TX}$ is supplied to the foreign object, which reduces the electric power $P_{RX}$ received by the power receiving apparatus 300. In this stage, the control error packet CE does not indicate an instruction to lower the electric power $P_{TX}$ to be transmitted. Accordingly, when the received electric power $P_{RX}$ in the current stage (t2) is lower than the received electric power $P_{RX}$ in the previous stage (t1), the abnormal state judgment unit 406 asserts the abnormal state detection signal S5.

The broken lines in FIG. 6 show, as a comparison example, waveforms that represent the operation in a case in which electric power transfer is maintained without performing an error handling operation even though the abnormal state detection signal S5 is asserted. After a foreign object is introduced at the time point t1, the received electric power $P_{RX}$ falls. In a case in which the load power of the power receiving apparatus 300 does not change in this stage, this leads to a reduction in the DC electric power $V_{RECT}$. In this case, the control error packet CE is raised according to such a reduction in the DC electric power $V_{RECT}$, which raises the transmitted electric power $P_{TX}$. Such an increase in the transmitted electric power $P_{TX}$ leads to an increase in the electric power supplied to the foreign object. This leads to further heating of the foreign object.

In order to solve such a problem, when the abnormal state detection signal S5 is asserted, the power transmission apparatus 200 and the power receiving apparatus 300 may perform a predetermined error handling operation. Description will be made below regarding an example of such an error handling operation.

For example, in order to provide such an error handling operation, the Qi standard defines several EPT (End of Power Transfer) packets. In this case, the communication unit 408 may transmit, to the power transmission apparatus 200, an EPT which indicates an assertion of the abnormal state detection signal S5. When the power transmission apparatus 200 receives the EPT that indicates the assertion of the abnormal state detection signal S5, the power transmission apparatus 200 may suspend the power supply operation. After a predetermined time period elapses, the power transmission apparatus 200 may restart the operation from the analog ping phase or otherwise from the digital ping phase. Also, when the power transmission apparatus 200 receives the EPT that indicates the assertion of the abnormal state detection signal S5, the power transmission apparatus 200 may restart the operation from the negotiation phase. That is to say, it can be understood that the EPT that indicates the assertion of the abnormal state detection signal S5 is used as the data which instructs the power transmission apparatus 200 to suspend the power supply operation.

Also, in addition to or otherwise instead of such an error handling operation, the power receiving apparatus 300 or otherwise the power transmission apparatus 200 may notify the user of the occurrence of such an abnormal state (introduction of a foreign object). Such a notice may be provided in the form of a sound. Also, the notice may be provided by means of a lighting device such as an LED or the like, or by means of a display device such as a display panel or the like if the power receiving apparatus 300 or the power transmission apparatus 200 includes such a display device. After the user receives such a notice, the user can remove the foreign object based on the notice thus received.

FIG. 7A is a flowchart showing the overall operation of the power supply system 100 in the power transfer phase. FIG. 7B shows judgment conditions used in the abnormal state detection.

Description will be made regarding the operation flow for each of the power transmission apparatus 200 and the power receiving apparatus 300.

(1) Power Transmission Apparatus 200 (TX) Operation Flow

The power transmission apparatus 200 performs a PID (Proportional Integral Derivative) control operation according to the control error packet CE transmitted from the power receiving apparatus 300, so as to determine the electric power to be transmitted (S200). The power transmission apparatus 200 controls the transmitted electric power such that it matches the target electric power to be transmitted thus determined (S202). The controlled electric power is transmitted to the power transmission apparatus 300 (S204).

Furthermore, the power transmission apparatus 200 receives the data which indicates the received electric power $P_{RX}$ measured by the power receiving apparatus 300. Subsequently, the power transmission apparatus 200 compares the data of the received electric power $P_{RX}$ with the electric power $P_{TX}$ transmitted from the power transmission apparatus 200 itself. Specifically, the power transmission apparatus 200 compares the difference $|P_{TX}-P_{RX}|$ with a predetermined threshold value ΔP (S206). When the difference $|P_{TX}-P_{RX}|$ is smaller than the threshold value ΔP (NO in S206) as a result of the comparison, the flow proceeds to Step S204, in which the power transmission apparatus 200 is allowed to perform power transmission. Conversely, when the difference $|P_{TX}-P_{RX}|$ is larger than the threshold value ΔP (YES in S206), the power transmission is suspended (S208).

(2) Power Receiving Apparatus 300 (RX) Operation Flow

The power receiving apparatus 300 receives electric power from the power transmission apparatus 200 (S300). Furthermore, the power receiving apparatus 300 measures the voltages at several nodes and the currents that flow through several paths so as to measure the input electric power and the output electric power (S302). The power receiving apparatus 300 calculates the control point CP and the received electric power $P_{RX}$ based on the measurement results (S304).

Subsequently, abnormal state judgment is made based on the CE (control error) value and the received electric power $P_{RX}$ (S306). That is to say, when there is a reduction in the actually received electric power $P_{RX}$ although the CE value is zero or a positive value, which indicates an instruction to maintain or otherwise to raise the received electric power $P_{RX}$, judgment is made that an abnormal state has occurred (YES in S306).

FIG. 7B shows the judgment conditions used in Step S306. The abnormal state judgment is made based on the CE value and the difference between the electric power $P_{RX\_PRE}$ received in the previous step and the electric power $P_{RX\_CUR}$ received in the current step, which is represented by $\Delta P_{RX} = P_{RX\_CUR} - P_{RX\_PRE}$. When the received electric power $P_{RX}$ detected by the electric power detection unit 402 falls (i.e., when $\Delta P_{RX} < 0$) although the control signal CE does not indicate an instruction to lower the received electric power $P_{RX}$ (i.e., when the CE value is set to a positive value or otherwise zero), the abnormal state judgment unit 406 judges that an abnormal state has occurred. In other words, when there is no increase in the received electric power $P_{RX}$ detected by the electric power detection unit 402 although the control signal CE indicates an instruction to raise the electric power to be transmitted, the abnormal state judgment unit 406 judges that an abnormal state has occurred. Specifically, when the difference $P_{RX}$ is a positive (+) value, judgment is made that the power transmission is being performed normally. When $\Delta P_{RX}$ is zero and the CE value is a positive value, judgment is made that an abnormal state has occurred. When $\Delta P_{RX}$ is zero and when the CE value is zero or otherwise a negative value, judgment is made that the power transmission is being performed normally.

When $\Delta P_{RX}$ is a negative (−) value and when the CE value is a positive value or zero, judgment is made that an abnormal state has occurred. When $\Delta P_{RX}$ is a negative (−) value and when the CE value is a negative value, judgment is made that the power transmission is being performed normally. More specifically, such detection of the received electric power $P_{RX}$ involves a certain amount of detection error due to the detection precision. In order to solve such a problem, a threshold value $\Delta TH$ may be set giving consideration to the detection error. With such an arrangement, abnormal state judgment may be made based on the magnitude relation between the difference $\Delta P_{RX}$ and the threshold value $\Delta TH$ thus set. For example, when the CE value is a positive value or otherwise zero, and when $\Delta P_{RX} < \Delta TH$, judgment may be made that an abnormal state has occurred. Also, when the difference is smaller than a value $\Delta EX$ that is estimated based on the CE value (when $\Delta P_{RX} < \Delta EX$), judgment may be made that an abnormal state has occurred even when the CE value is a negative value. It should be noted that, even in a case in which the CE value is a negative value and accordingly, $\Delta P_{RX}$ is a negative (−) value, when $\Delta EX < \Delta P_{RX} < 0$ holds true, for example, judgment may be made that the power transmission is being performed normally. Also, in the comparison step, with an average value of the received electric power $P_{RX}$ detected in n previous steps as $P_{AV}$, which is represented by $P_{AV} = (P_{RX1} + P_{RX2} + \ldots + P_{RXn})/n$, comparison may be made between $\Delta P_{RX}/P_{AV}$ and a corresponding value $\Delta' EX$ estimated based on the CE value.

In a case in which judgment has been made in Step S306 that an abnormal state has occurred (YES in S306), the power receiving apparatus 300 transmits an end power transfer packet (S308). In a case in which judgment has been made in Step S306 that the power transmission is being performed normally (NO in Step S306), the power receiving apparatus 300 determines the CE value based on the control point CP (S310), the power receiving apparatus 300 calculates the received electric power $P_{RX}$ (S311) and transmits the CE packet and a packet that indicates the received electric power $P_{RX}$ to the power transmission apparatus 200 (S312, S314). It should be noted that, after the power receiving apparatus 300 transmits the end power transfer packet (S308), the power receiving apparatus 300 and the power transmission apparatus 200 both transit to the selection phase φ1 shown in FIG. 4 after the power transmission apparatus 200 receives the end power transfer packet. With such an arrangement, when judgment has been made in Step S306 that an abnormal state has occurred, a predetermined bit of the end power transfer packet may be turned on (set to 1). When the power transmission apparatus 200 detects that the predetermined bit of the end power transfer packet is turned on, the power transmission apparatus 200 may perform a foreign object detection operation. Known examples of such a foreign object detection operation include Q-value (Quality factor) measurement. When a foreign object is present, this reduces the Q value. Thus, by comparing the measured Q value with a Q value estimated assuming that there is no foreign object, such an arrangement is capable of detecting the presence or absence of a foreign object with high precision.

Figure 8:
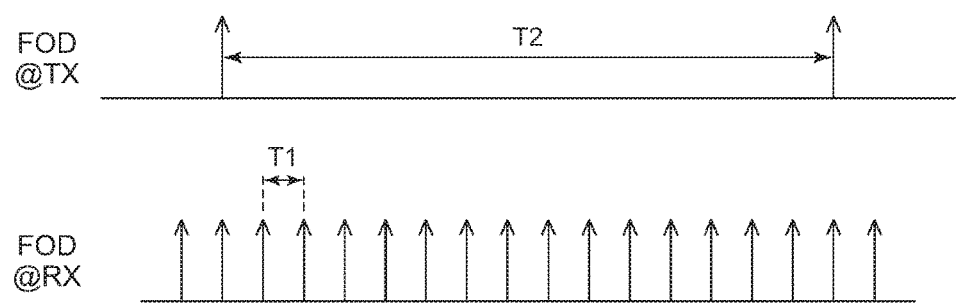
FIG. 8 is a time chart showing foreign object detection provided by the power transmission apparatus and abnormal state judgment provided by an abnormal state judgment unit.

FIG. 8 is a time chart showing the foreign object detection (FOD@TX) provided by the power transmission apparatus 200 and the abnormal state judgment (FOD@RX) provided by the abnormal state judgment unit 406.

Figure 7:
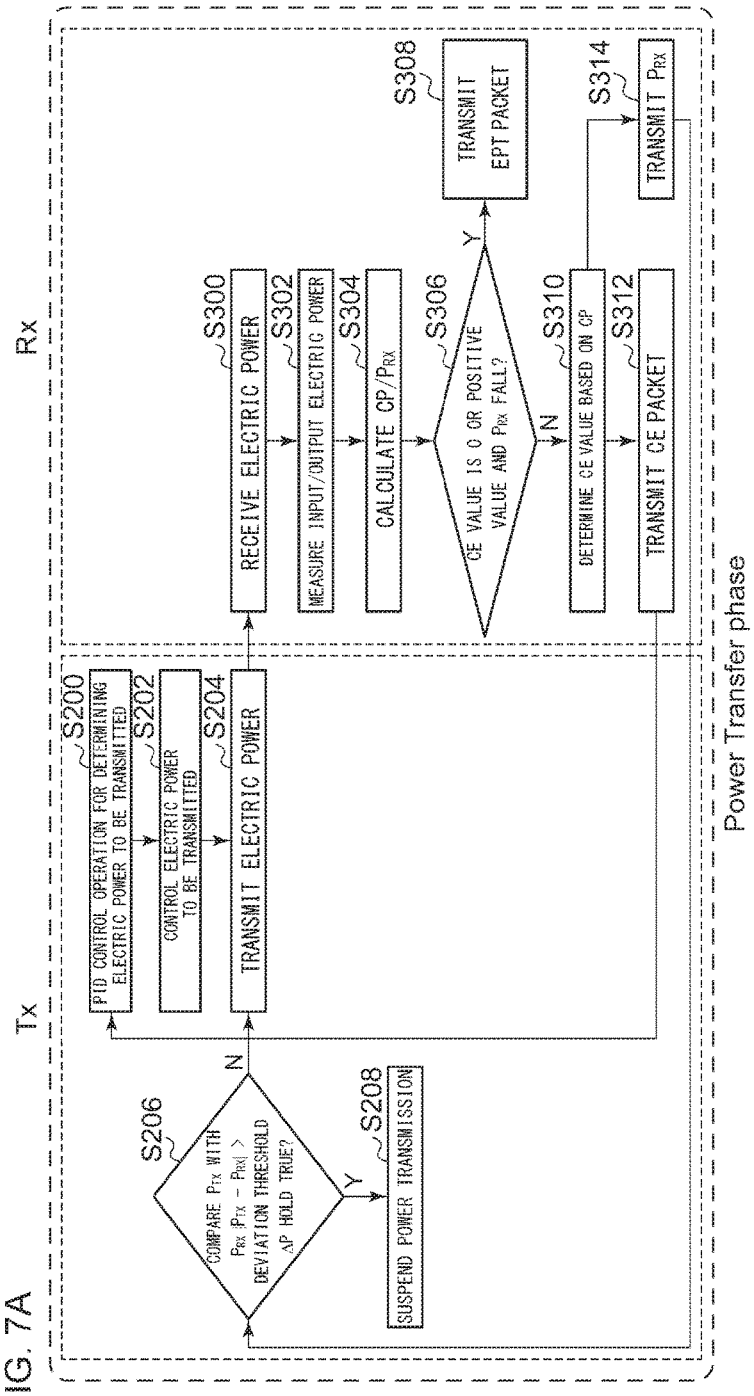
FIG. 7A is a flowchart showing the overall operation of the power supply system in the power transfer phase according to the embodiment.
FIG. 7B is a diagram showing judgment conditions used for abnormal state detection.

The abnormal state judgment unit 406 judges, for every first period T1, whether or not an abnormal state has occurred. That is to say, Step S306 shown in FIG. 7 is performed for every first period T1. On the other hand, the FOD according to a conventional technique is performed by the power transmission apparatus 200 for every second period T2, which is longer than the first period T1. That is to say, Step S206 and Step S314 shown in FIG. 7 are performed for every second period T2. The first period T1 may be set to a period having the same extent as that for which the control signal CE is generated. Specifically, the first period T1 is set to 10 to 30 ms. On the other hand, the second period T2 is set to 1.5 to 4 s.

The above is the overall operation of the power receiving apparatus 300 and the power supply system 100. Next, description will be made regarding the advantages provided by the power receiving apparatus 300.

With the power receiving apparatus 300 according to the embodiment, an abnormal state is detected based on the received electric power $P_{RX}$ and the control signal CE which indicates the electric power to be transmitted. The electric power $P_{TX}$ transmitted from the wireless power transmission apparatus 200 changes according to the control signal (control error packet) CE transmitted from the wireless power receiving apparatus 300. Accordingly, when the received electric power $P_{RX}$ detected by the electric power detection unit 402 falls although the power receiving apparatus 300 has not instructed the wireless power transmission apparatus 200 to lower the transmitted electric power $P_{TX}$, judgment can be made that a certain abnormal state such as a newly introduced foreign object, misalignment between the transmission coil and the reception coil, or the like, has occurred. That is to say, with the control circuit 400, such an arrangement allows the power receiving apparatus 300 to detect such an abnormal state by itself without referring to the transmitted electric power measured by the power transmission apparatus 200.

In addition to such an operation, by transmitting the data that indicates the received electric power $P_{RX}$ to the power transmission apparatus 200, such an arrangement also allows the power transmission apparatus 200 to perform the FOD operation based on the comparison result between the transmitted electric power $P_{TX}$ and the received electric power $P_{RX}$. Furthermore, by setting the first period T1 to be shorter than the second period T2, such an arrangement allows the abnormal state judgment to be made with a higher rate than that according to a conventional technique.

Description has been made above regarding the present invention with reference to the embodiments. The above-described embodiments have been described for exemplary purposes only, and are by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

[First Modification]

Description has been made in the embodiment regarding an arrangement in which the abnormal state judgment unit 406 judges whether or not an abnormal state has occurred, based on the comparison result between the received electric power $P_{RX}$ detected in the immediately previous step and the received electric power $P_{RX}$ detected in the current step. However, the present invention is not restricted to such an arrangement.

In a first modification, a threshold value $P_{TH}$ is set based on the received electric power $P_{RX}$ detected in the previous step. Furthermore, judgment is made whether or not an abnormal state has occurred, based on the comparison result between the threshold value $P_{TH}$ and the received electric power $P_{RX}$ detected in the current step.

The abnormal state judgment unit 406 sets the threshold value $P_{TH}$ based on the measurement values of the received electric power $P_{RX}$ obtained in multiple previous detection steps or otherwise based on the received electric power $P_{RX}$ measured for a predetermined period of time in a period in which judgment was made that a normal operation was being performed. The abnormal state judgment unit 406 sets the threshold value $P_{TH}$ based on the average value of the past data of the received electric power $P_{RX}$. Examples of such an average that can be employed include a simple average, weighted average, moving average, and the like.

In a case of employing a simple average of the values of the previous n steps, the abnormal state judgment unit 406 holds the past values of the received electric power $P_{RX}$ with the value obtained in the immediately previous step as $P_{RX1}$, with the value in the step immediately before the step in which $P_{RX1}$ is obtained as $P_{RX2}$, with the value in the step immediately before the step in which $P_{RX2}$ is obtained as $P_{RX3}$, and so forth. With such an arrangement, the threshold value $P_{TH}$ can be set based on the following Expression.

$P_{TH}=(P_{RX1}+P_{RX2}+\ldots+P_{RXn})/n$

For example, n may be set to a number on the order of 3.

In a case of employing a weighed average, the threshold value $P_{TH}$ may be set based on the following Expression.

$P_{TH}=(A_1 \cdot P_{RX1}+A_2 \cdot P_{RX2}+\ldots+A_n \cdot P_{RXn})/n$

Here, A represents each weighting coefficient defined so as to satisfy the following conditions.

$A_1+A_2+\ldots+A_n=1$ $A_1 \geq A_2 \geq \ldots \geq A_n \geq 0$

The weighting coefficients $A_1$ through $A_n$ may be configured as linear weighting coefficients, thereby providing a linear weighted moving average. Also, the weighting coefficients $A_1$ through $A_n$ may be configured as exponential weighting coefficients, thereby providing an exponential weighted moving average in which the weighting coefficient is reduced in an exponential manner.

More preferably, the abnormal state judgment unit 406 may set the threshold value $P_{TH}$ to a value obtained by subtracting a predetermined allowable difference $\Delta P$ from the received electric power $P_{RX}$ detected in a period in which judgment has been made that a normal operation is being performed. In this case, when the difference between the received electric power $P_{RX}$ detected in the normal state and the received electric power $P_{RX}$ detected by the electric power detection unit in the current step exceeds the allowable difference $\Delta P$, judgment is made that an abnormal state has occurred.

The allowable difference $\Delta P$ may be set to a value on the order of several hundred mW, and specifically, on the order of 250 mW. Also, such an arrangement preferably allows the designer of the electronic device 500 to set the allowable difference $\Delta P$ via a circuit external to the control circuit 400. Such a setting method is not restricted in particular. Examples of such a setting method that can be employed include: setting using serial data communication, setting by rewriting ROM, voltage setting via a setting pin, and the like.

Figure 9:
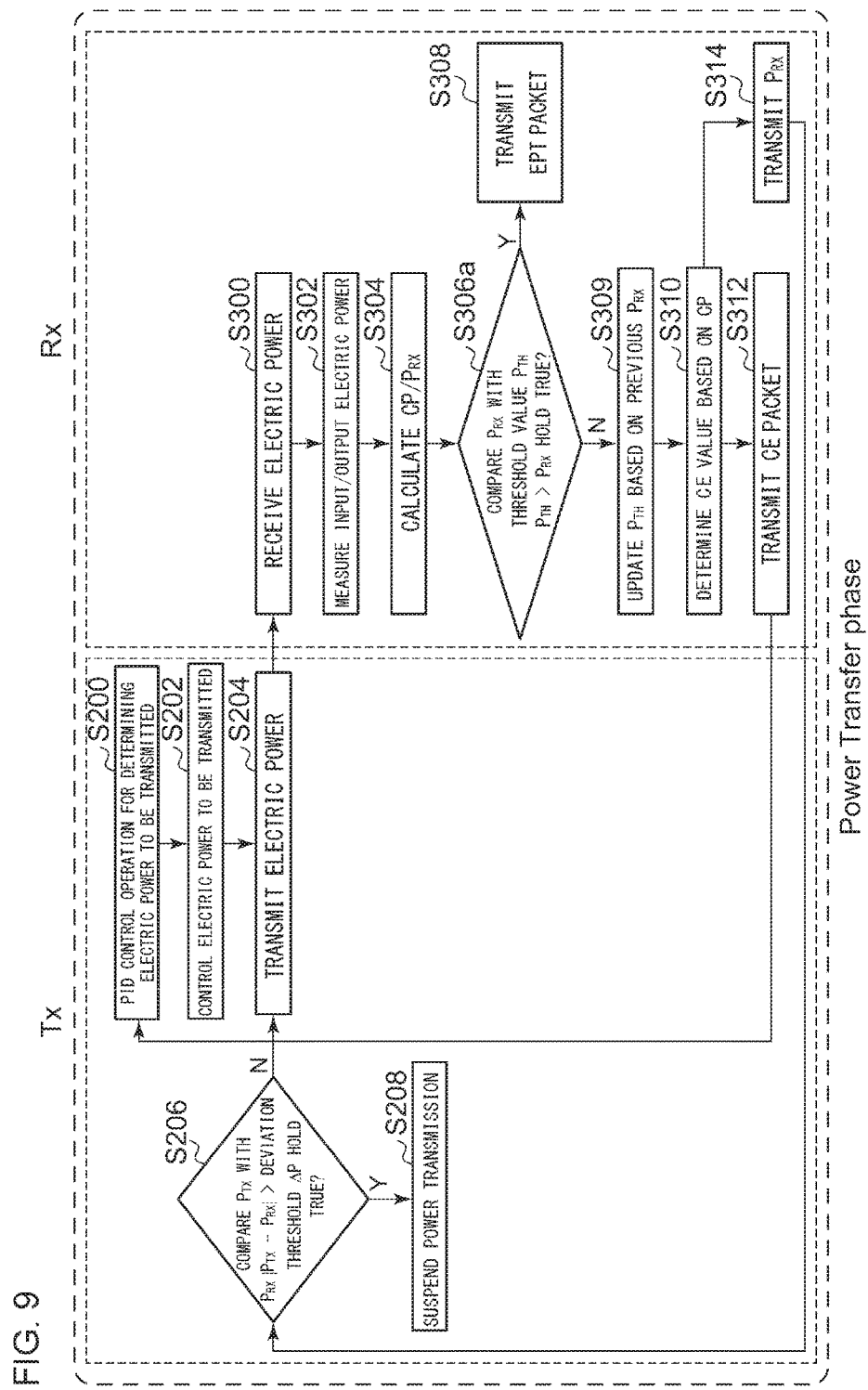
FIG. 9 is a flowchart showing the overall operation of a power supply system in the power transfer phase according to a first modification.

FIG. 9 is a flowchart showing the overall operation of the power supply system in the power transfer phase according to the first modification.

The operation of the power transmitter side (TX) shown in FIG. 9 is the same as that shown in FIG. 7A. Accordingly, description will be made regarding the point of difference in the operation of the power receiver side (RX).

In this modification, in Step S306*a*, judgment is made whether or not an abnormal state has occurred, based on the comparison result between the threshold value $P_{TH}$ set based on the past state and the received electric power $P_{RX}$ detected in the current step. When $P_{TH}>P_{RX}$ holds true as the comparison result, judgment is made that an abnormal state has occurred (YES in S306*a*).

When $P_{TH}<P_{RX}$ holds true as the comparison result, judgment is made that the operation is being performed normally (NO in S306*a*). Subsequently, the threshold value $P_{TH}$ is calculated and updated based on the received electric power $P_{RX}$ thus measured (S309).

The above is the operation of the first modification. Next, description will be made regarding the advantages provided by the modification.

In this modification, the abnormal state judgment unit 406 sets the threshold value $P_{TH}$ based on the received electric power $P_{RX}$ detected by the electric power detection unit in a past period of time in which judgment was made that the normal operation was being performed. Furthermore, the abnormal state judgment unit 406 judges whether or not an abnormal state has occurred, based on the comparison result between the threshold value $P_{TH}$ thus set and the received electric power $P_{RX}$ detected by the electric power detection unit 402 in the current stage.

Foreign object detection based on the comparison between the received electric power $P_{RX}$ and the transmitted electric power $P_{TX}$ requires high precision in the detection of the absolute value of the received electric power $P_{RX}$. In contrast, with such a modification, the threshold value $P_{TH}$ is set based on the measurement value of the received electric power $P_{RX}$. Thus, the electric power detection unit 402 is not necessarily required to detect the absolute value of the received electric power $P_{RX}$ with high precision. Instead, such a modification requires the electric power detection unit 402 to detect only the relative value of the received electric power $P_{RX}$ with high precision. This means that such a modification allows the foreign object detection to be performed without giving consideration to the coil coupling coefficient or the like. Furthermore, this means that such a modification allows the electric power detection unit 402 to have a simple configuration.

More detailed description will be made below. The electric power P is represented by the product of the voltage V and the current I. With such an arrangement, the voltage V is read by means of an ADC (Analog Digital Converter) after it is divided using resistors, for example. On the other hand, the current is read by means of an ADC after it is converted into a voltage using a current sensing amplifier. With the value thus read by the ADC as y, with the voltage or current as x, and with predetermined coefficients depending on the apparatus as a and b (a: slope; b: offset), the value read by means of such an ADC is represented by y=a·x+b. In a case in which there is relative error, by employing the difference between the values thus read out, such an arrangement allows the offset to be canceled out. Thus, the detection precision depends on only the slope a, thereby providing detection precision having improved uniformity regardless of the level of the electric power. In contrast, in a case in which the detection precision depends on the absolute measurement error, the slope and the offset directly have an effect on the detection precision. For example, when the electric power is small, the offset has a large effect. As the electric power becomes larger, the effect of the slope becomes larger.

Furthermore, the abnormal state judgment unit 406 is designed to set the threshold value $P_{TH}$ based on the data of the received electric power $P_{RX}$ detected in multiple previous steps or for a predetermined period of time in a period in which judgment was made that a normal operation was being performed.

Such an arrangement allows the effect of noise or the like to be removed, thereby providing abnormal state detection in a stable manner.

Furthermore, the abnormal state judgment unit 406 sets the threshold $P_{TH}$ to a value obtained by subtracting the predetermined allowable difference $\Delta P$ from the received electric power detected in a period in which judgment was made that the normal operation was being performed. This allows the sensitivity of the abnormal state detection to be adjusted according to the allowable difference $\Delta P$. In particular, by allowing the allowable difference $\Delta P$ to be set via a circuit external to the control circuit 400, such an arrangement allows an optimum allowable difference $\Delta P$ to be set for each electronic device 500 that mounts the control circuit 400.

The abnormal state detection shown in FIG. 7A can be regarded as the first modification with the allowable difference $\Delta P$ set to 0, and the threshold value $P_{TH}$ set to the received electric power $P_{RX}$ measured in the immediately previous step.

[Second Modification]

In this modification, the power receiving apparatus 300 performs the abnormal state judgment without using the past measurement data of the received electric power $P_{RX}$. Instead, the power receiving apparatus 300 performs the abnormal state judgment based on the expected value $P_{EX}$ of the received electric power to be received by the power receiving apparatus 300 in the current stage. The common point of the second modification and the embodiment and the first modification is that the past state of the power receiving apparatus 300 is reflected in the expected value $P_{EX}$.

The expected value $P_{EX}$ of the received electric power can be estimated based on the expected value of the rectified voltage $V_{RECT}$, the expected value of the load current $I_{LOAD}$, etc.

$$P_{EX} = V_{CP} \times I_{LOAD} + V_{DD} \times I_{DD}$$

Here, $V_{CP}$ represents the expected value of the rectified voltage $V_{RECT}$, which corresponds to the control point CP.

The second term of the right-hand side, i.e., $V_{DD} \times I_{DD}$ represents the power consumption of the control circuit 400 itself.

Figure 10:
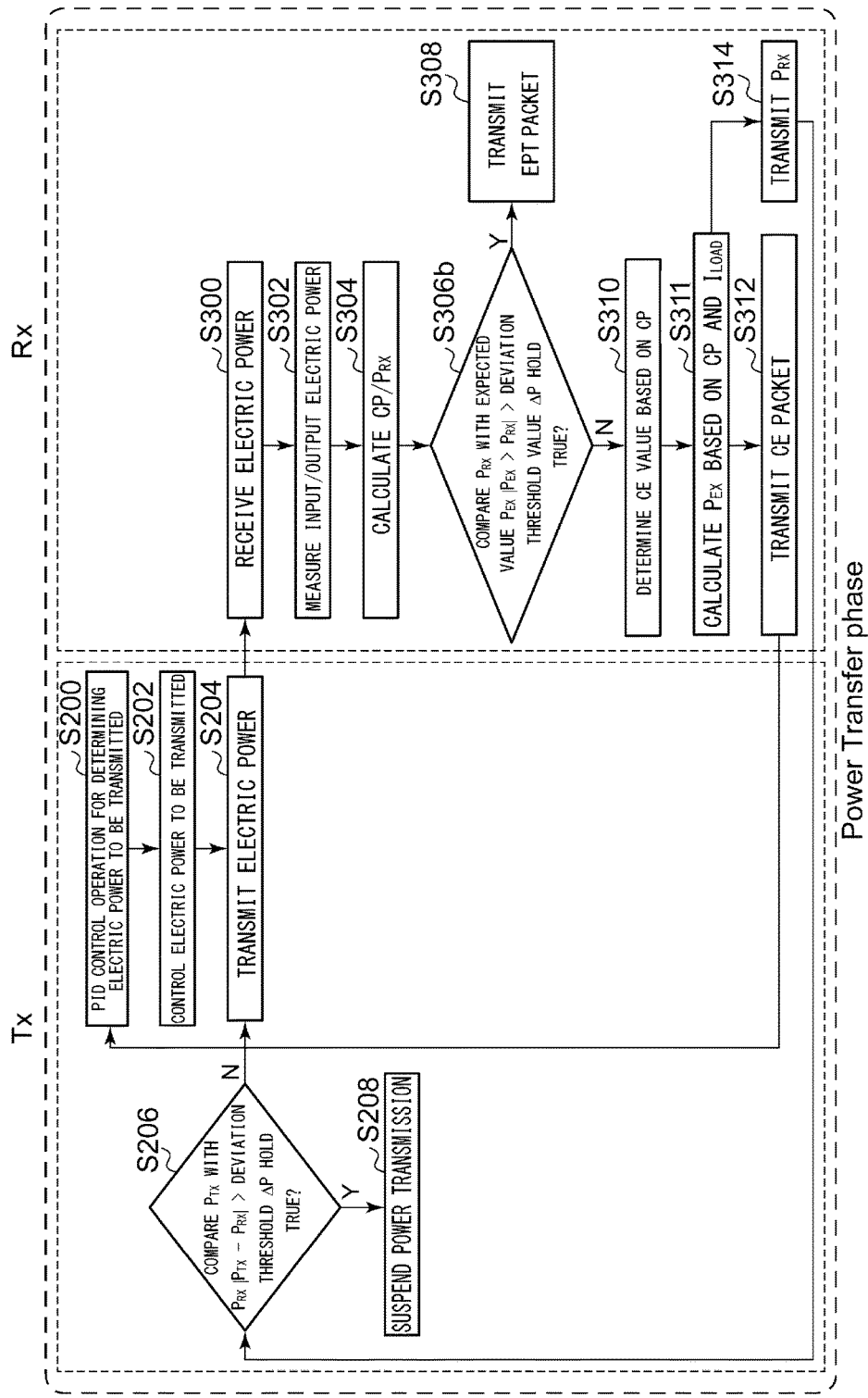
FIG. 10 is a flowchart showing the overall operation of a power supply system in the power transfer phase according to a second modification.

FIG. 10 is a flowchart showing the overall operation of the power supply system 100 in the power transfer phase according to the second modification. The operation of the power transmitter side shown in FIG. 10 is the same as that shown in FIG. 7. Accordingly, description will be made regarding only the point of difference in the operation of the power receiver side.

In this modification, judgment is made whether or not an abnormal state has occurred, based on the expected value $P_{EX}$ calculated beforehand and the received electric power $P_{RX}$ measured in the current stage (S306b). More specifically, the difference between the expected value $P_{EX}$ and the received electric power measured in the current stage, i.e., ($P_{EX} - P_{RX}$), may be calculated. Also, the calculated difference ($P_{EX} - P_{RX}$) may be compared with an allowable difference $\Delta P$ so as to judge the presence or absence of an abnormal state.

When $|P_{EX} - P_{RX}| > \Delta P$ (YES in S306b), judgment is made that an abnormal state has occurred, and an end power transfer packet is transmitted (S308).

Conversely, when $|P_{EX} - P_{RX}| < \Delta P$ (NO in S306b), judgment is made that a normal operation is being performed, and the CE value is determined based on the control point CP (S310). Furthermore, the expected value $P_{EX}$ of the received electric power is calculated and updated based on the control point CP and the load current $I_{OUT}$.

The abnormal state judgment according to the second modification can be regarded as an arrangement in which two threshold values ($P_{EX} + \Delta P$) and ($P_{EX} - \Delta P$) are set based on the calculated expected value $P_{EX}$, and the received electric power $P_{RX}$ is compared with the two threshold values ($P_{EX} \pm \Delta P$) thus set.

Such a modification requires the electric power detection unit 402 to have high absolute detection precision. However, with such a modification, an abnormal state can be detected by the power receiving apparatus 300 by itself, which is the same advantage as that provided by the embodiment.

[Third Modification]

In addition to a case in which a foreign object is introduced, in a case in which coil misalignment has occurred, this reduces the coupling coefficient K between the power transmission coil and the power reception coil. This also reduces the received electric power $P_{RX}$ measured by the electric power detection unit 402. Thus, the power receiving apparatus 300 according to the embodiment is applicable to the detection of an abnormal state due to such coil misalignment.

[Fourth Modification]

Description has been made in the embodiment regarding an arrangement in which the received electric power $P_{RP}$ is detected according to the Expression (1). However, the present invention is not restricted to such an arrangement. In a case in which the electric power consumption of the control circuit 400 is negligible, the term $V_{DD} \times I_{DD}$ may be omitted. Also, in a case in which the thermal loss is negligible, the term $R_{ON} \times I_{LOAD}^2$ may be omitted. Also, the power consumption may be acquired in an entirely different manner.

[Fifth Modification]

Description has been made in the embodiment (FIG. 7), the first modification (FIG. 9), and the second modification (FIG. 10) regarding an arrangement in which, when the abnormal state judgment unit 406 has judged that an abnormal state is present, the EPT packet is transmitted so as to suspend the power supply operation. However, the present invention is not restricted to such an arrangement.

Figure 11:
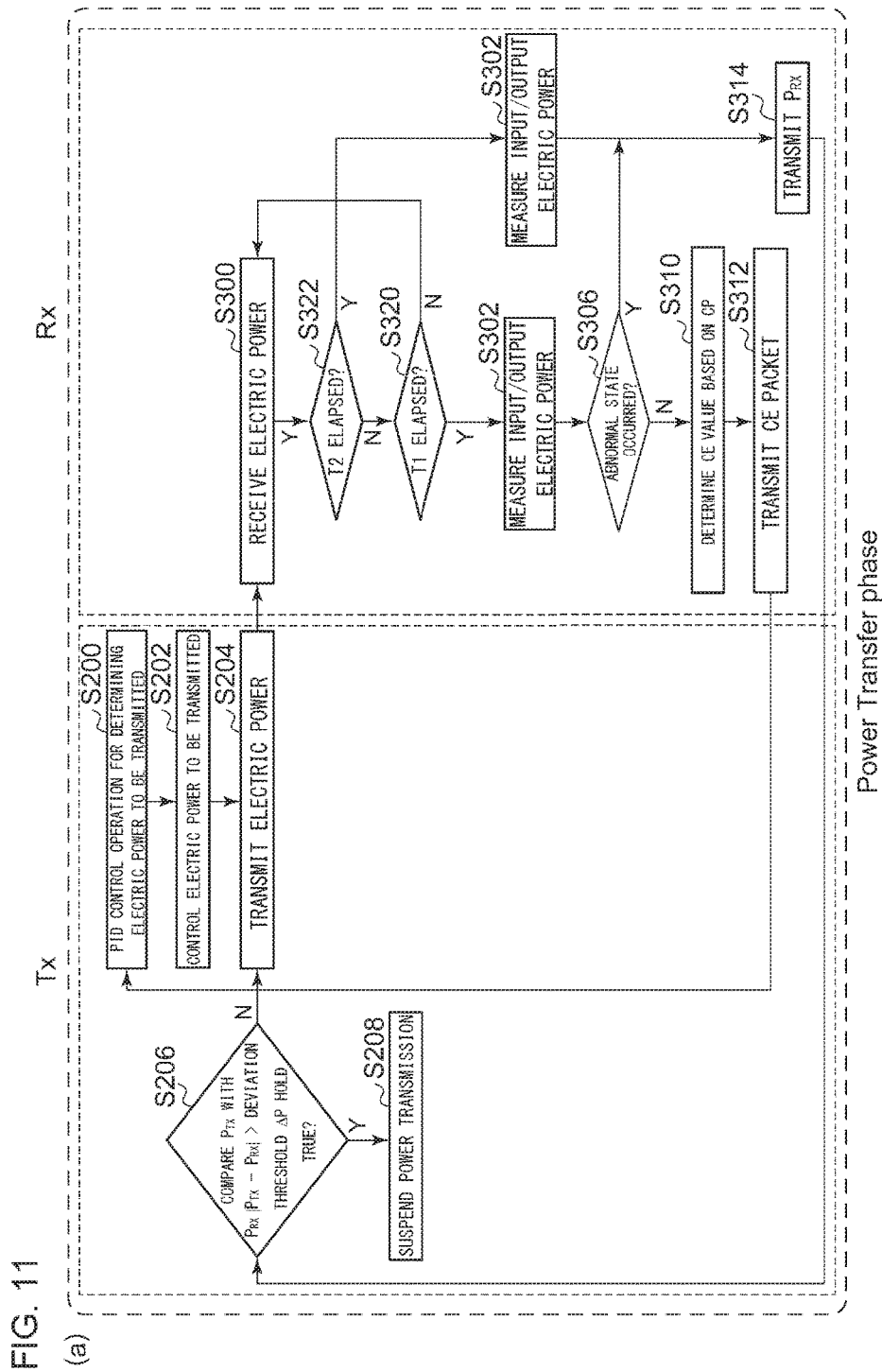
FIG. 11 is a flowchart showing the overall operation of a power supply system in the power transfer phase according to a fifth modification.

FIG. 11 is a flowchart showing the overall operation of a power supply system in the power transfer phase according to a fifth embodiment.

The input/output electric power is measured (S302) every time the second period T2 elapses (YES in S322). The measurement data of the received electric power $P_{RX}$ is transmitted to the power transmission apparatus 200 (S314). Furthermore, during each second period T2 (NO in S322), the power supply system waits for each first period T1 to elapse (NO in S320). The input/output electric power is measured (S302) every time the first period T1 elapses (YES in S320). Abnormal state judgment is made based on the measurement results thus obtained (S306). The abnormal state judgment method employed in Step S306 may be configured as any one of the methods shown in FIGS. 7, 9, and 10. When judgment has been made in Step S306 that an abnormal state has occurred (YES in S306), a packet (data) that indicates the detection value of the received electric power $P_{RX}$ is transmitted to the power transmission apparatus 200 (S314) instead of transmitting the EPT packet. Immediately after the power transmission apparatus 200 receives the packet (data), the power transmission apparatus 200 instantly performs foreign object detection based on a comparison between the data that indicates the detection value of the received electric power $P_{RX}$ and the transmitted electric power $P_{TX}$ measured by the power transmission apparatus 200 (S206).

When judgment has been made that a normal operation is being performed (NO in S306) as a result of the abnormal state judgment, the CE value is determined based on the control point CP (S310), and the CE packet is transmitted to the power transmission apparatus 200 (S312).

Figure 12:
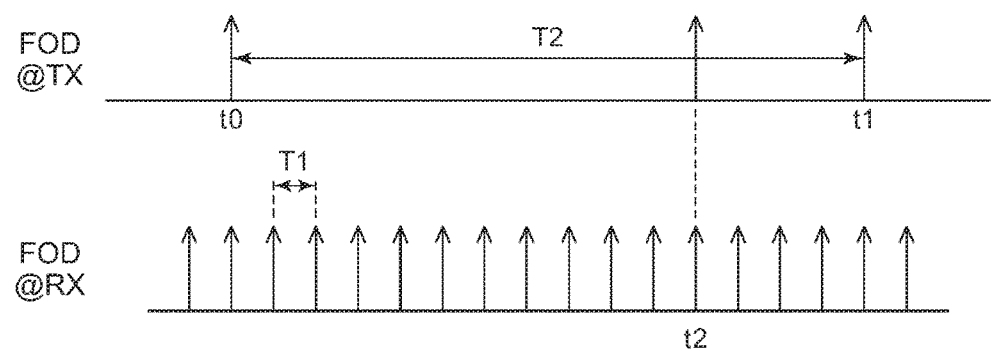
FIG. 12 is a time chart showing foreign object detection (FOD@TX) provided by the power transmission apparatus and abnormal state judgment (FOD@RX) provided by the abnormal state judgment unit according to a fifth modification.

FIG. 12 is a time chart showing the foreign object detection provided by the power transmission apparatus (FOD@TX) and the foreign object detection provided by the power receiving apparatus (FOD@RX). As a regular foreign object detection operation, the power transmission apparatus 200 performs the foreign object detection at time intervals of T2 (t0, t1, . . . ). On the other hand, the power receiving apparatus 300 performs the foreign object detection at time intervals of T1. When the power receiving apparatus 300 has judged at the time point t2 that an abnormal state has occurred, the power transmission apparatus 200 instantly performs the foreign object detection. Such an arrangement allows the power transmission apparatus 200 to detect a foreign object before the time point t1 immediately after the power receiving apparatus 300 has judged that an abnormal state has occurred.

[Sixth Modification]

Figure 13:
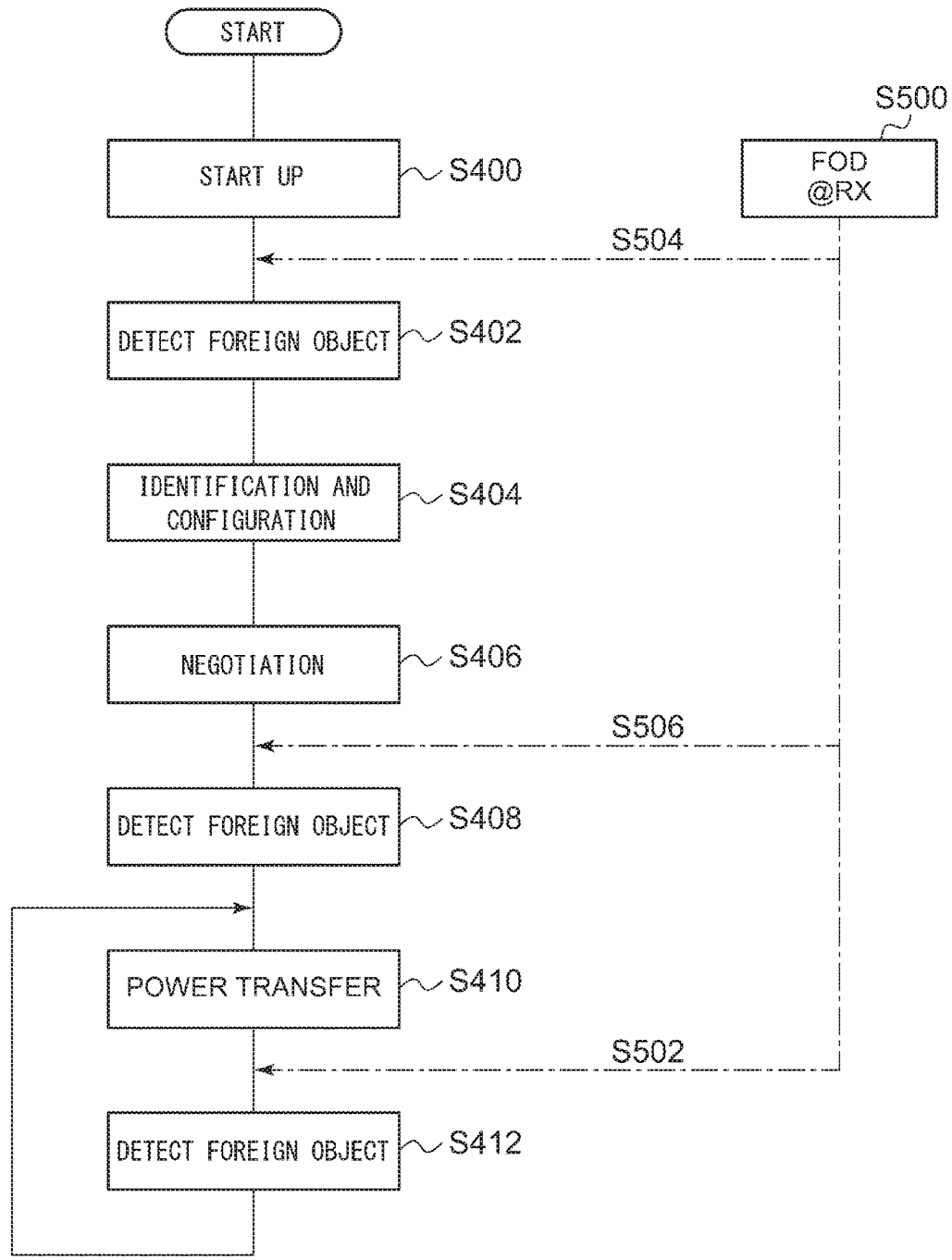
FIG. 13 is a flowchart showing the operation of a power transmission apparatus according to a sixth modification.

Another modification may be made for an operation when the abnormal state judgment unit 406 has judged that an abnormal state has occurred. FIG. 13 is a flowchart showing the operation of the power transmission apparatus 200 according to a sixth modification. Immediately after the power transmission apparatus 200 is started up (S400), the power transmission apparatus 200 enters a first test mode in which the power transmission apparatus 200 judges whether or not a foreign object is present (S402). In the first test mode, the power transmission apparatus 200 preferably performs foreign object detection using a method that can be provided by the power transmission apparatus 200 by itself. For example, the power transmission apparatus 200 may measure the Q value of the transmission antenna or otherwise the resonance frequency of the transmission antenna so as to provide the foreign object detection.

When judgment has been made in Step S402 that a normal operation is being performed, the power transmission apparatus 200 enters the identification and configuration phase φ3 (S404). Next, the power transmission apparatus 200 enters the negotiation phase φ4 (S406). After a link is established between the power transmission apparatus 200 and the power receiving apparatus 300, the power transmission apparatus 200 enters a second test mode in which the power transmission apparatus 200 again judges whether or not a foreign object is present (S408). The foreign object detection in the second mode may be performed by the power transmission apparatus 200 by itself. Also, the power transmission apparatus 200 may perform the foreign object detection based on the information received from the power receiving apparatus 300. When, as a result of the foreign object detection in the second mode, judgment has been made that a normal operation is being performed, the power transmission apparatus 200 transits to the power transfer phase φ5 (S410). The same foreign object detection as described above is performed in the power transfer phase φ5 (S412).

When the power receiving apparatus 300 has judged that an abnormal state has occurred (S500), the power transmission apparatus 200 in the power transfer phase may perform the foreign object detection processing as an interrupt (S412) as indicated with long and short dashes S502. Such an operation corresponds to the operation shown in FIG. 12.

Alternatively, as indicated by the line of alternately long and short dashes S504, the flow may return to the first test mode, and the identification and configuration phase φ3 may be performed again. Also, in this case, as indicated by the line of alternately long and short dashes S506, the flow may return to the second test mode, and the operation may be restarted from the negotiation phase.

Description has been made in the embodiment regarding a wireless power transmission apparatus that conforms to the Qi standard. However, the present invention is not restricted to such an arrangement. Also, the present invention is applicable to the power receiving apparatus 300 which is to be employed in a system that is similar to the Qi standard. Also, the present invention is applicable to the power receiving apparatus 300 that conforms to other standards which will be developed in the future.

[Seventh Modification]

A part of the modulator 308 or a part of the power supply circuit 504 may be further integrated on the IC on which the control circuit 400 is integrated.

Figure 14:
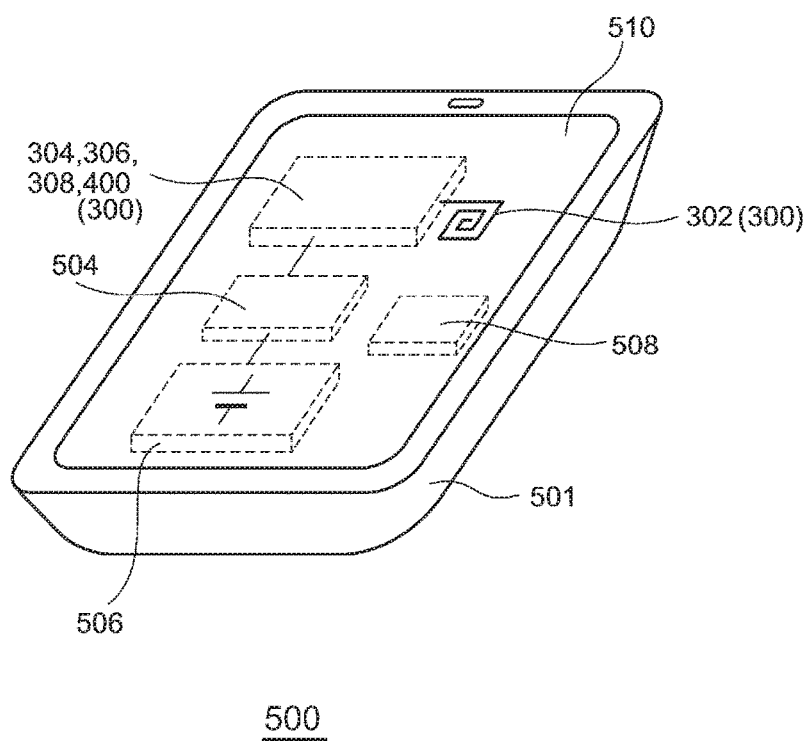
FIG. 14 is a diagram showing an electronic device including the power receiving apparatus according to the embodiment.

Lastly, description will be made regarding a specific example of an electronic device. FIG. 14 is a diagram showing the electronic device 500 including the power receiving apparatus 300 according to the embodiment. The electronic device 500 shown in FIG. 14 is configured as a smartphone, tablet PC, portable game machine, portable audio player, or the like. A housing 501 includes, as built-in components, a power supply circuit 504, a secondary battery 506, a processor 508, a display apparatus 510, and the aforementioned power receiving apparatus 300. The processor 508 may include a wireless (RF) unit, a baseband processor, an application processor, an audio processor, and the like.

Description has been made regarding the present invention with reference to the embodiments using specific terms. However, the above-described embodiments show only the mechanisms and applications of the present invention for exemplary purposes only, and are by no means intended to be interpreted restrictively. Rather, various modifications and various changes in the layout can be made without departing from the spirit and scope of the present invention defined in appended claims.

DESCRIPTION OF THE REFERENCE NUMERALS

100 power supply system, 200, TX power transmission apparatus, 202 transmission coil, 204 driver, 206 controller, 208 demodulator, 300, RX power receiving apparatus, 302 reception coil, 304 rectifier circuit, 306 smoothing capacitor, 308 modulator, 400 control circuit, 402 electric power detection unit, 404 control unit, 406 abnormal state judgment unit, 408 communication unit, S1 driving signal, 500 electronic device, 501 housing, 502 load, 504 power supply circuit, 506 secondary battery, 508 processor.

INDUSTRIAL APPLICABILITY

The present invention is applicable to the wireless supply of power.

What is claimed is:

1. A control circuit employed for a wireless power receiving apparatus that receives an electric power signal from a wireless power transmission apparatus, the control circuit comprising:
  an electric power detection unit that detects a received electric power received by the wireless power receiving apparatus;
  a control unit that generates a control signal for controlling a transmitted electric power to be transmitted from the wireless power transmission apparatus; and
  an abnormal state judgment unit that judges whether or not an abnormal state has occurred, based on the received electric power detected by the electric power detection unit and a past state of the wireless power receiving apparatus;
  wherein the abnormal state judgment unit sets a threshold value based on past data of the received electric power detected by the electric power detection unit in a period in which judgment was made that a normal operation was being performed,
  and wherein the abnormal state judgment unit judges whether or not an abnormal state has occurred, based on a comparison result between the threshold value and the received electric power detected by the electric power detection unit in a current stage.

2. The control circuit according to claim 1, wherein, when the received electric power detected by the electric power detection unit falls despite the control signal not indicating an instruction to lower the electric power to be transmitted, the abnormal state judgment unit judges that an abnormal state has occurred.

3. The control circuit according to claim 1, wherein the abnormal state judgment unit sets the threshold value based on past data of the received electric power detected by the electric power detection unit multiple times or otherwise for a predetermined period of time in a period in which judgment was made that a normal operation was being performed.

4. The control circuit according to claim 1, wherein the abnormal state judgment unit sets the threshold value to a value obtained by subtracting a predetermined allowable difference from the received electric power detected in a normal state.

5. The control circuit according to claim 4, wherein the allowable difference can be set via an external circuit.

6. The control circuit according to claim 1, wherein the abnormal state judgment unit calculates an expected value of the received electric power to be received by the wireless power receiving apparatus,
  and wherein the abnormal state judgment unit judges whether or not an abnormal state has occurred, based on the expected value and the received electric power detected by the electric power detection unit in a current stage.

7. The control circuit according to claim 6, wherein, when a difference between the received electric power detected by the electric power detection unit in the current stage and the expected value exceeds a predetermined allowable difference, the abnormal state judgment unit judges that an abnormal state has occurred.

8. The control circuit according to claim 1, further comprising a communication unit that transmits, to the wireless power transmission apparatus, the control signal and data that indicates a detection value of the received electric power,
  wherein, when the abnormal state judgment unit has judged that an abnormal state has occurred, the communication unit transmits data that instructs the wireless power transmission apparatus to suspend a power supply operation.

9. The control circuit according to claim 1, further comprising a communication unit that transmits, to the wireless power transmission apparatus, the control signal and data that indicates a detection value of the received electric power,
  wherein the abnormal state judgment unit is configured to judge, for every first period, whether or not an abnormal state is present,
  and wherein the communication unit transmits data that indicates a detection value of the received electric power to the wireless power transmission apparatus for every second period, which is longer than the first period.

10. The control circuit according to claim 9, wherein, when the abnormal state judgment unit judges that an abnormal state has occurred, the communication unit transmits data that indicates a detection value of the received electric power to the wireless power transmission apparatus.

11. The control circuit according to claim 1, further comprising a communication unit that transmits, to the wireless power transmission apparatus, the control signal and data that indicates a detection value of the received electric power,
  wherein, when the abnormal state judgment unit judges that an abnormal state has occurred, the communication unit transmits data that instructs the wireless power transmission apparatus to perform foreign object detection.

12. The control circuit according to claim 1, wherein the control circuit conforms to the Qi standard.

13. The control circuit according to claim 1, monolithically integrated on a single semiconductor substrate.

14. An electronic device comprising:
a reception antenna comprising a reception coil that receives the electric power signal;
a rectifier circuit that rectifies a current that flows through the reception coil;
a smoothing capacitor that is connected to an output of the rectifier circuit, so as to generate a rectified voltage; and
the control circuit according to claim 1.

15. A method for detecting an abnormal state, which is employed in a wireless power receiving apparatus that receives an electric power signal transmitted from a wireless power transmission apparatus, the method comprising:
detecting a received electric power received by the wireless power receiving apparatus;
generating a control signal for controlling a transmitted electric power to be transmitted from the wireless power transmission apparatus;
judging whether or not an abnormal state has occurred, based on the received electric power thus detected and a state of the wireless power transmission apparatus;
setting a threshold value based on past detected data of the received electric power in a period in which judgment was made that a normal operation was being performed;
wherein, in the judging, whether or not an abnormal state is present is judged based on a comparison result between the threshold value and the received electric power detected in a current stage.

16. The method according to claim 15, wherein, in the judging, when the received electric power thus detected falls despite the control signal not indicating an instruction to lower the electric power to be transmitted, judgment is made that an abnormal state has occurred.

17. The method according to claim 15, further comprising calculating an expected value of the received electric power to be received by the wireless power receiving apparatus, wherein, in the judging, whether or not an abnormal state is present is judged based on the expected value and the received electric power detected in a current stage.

18. The method according to claim 17, wherein, in the judging, when a difference between the received electric power detected in the current stage and the expected value exceeds a predetermined allowable difference, judgment is made that an abnormal state has occurred.

19. A control circuit employed for a wireless power receiving apparatus that receives an electric power signal from a wireless power transmission apparatus, the control circuit comprising:
an electric power detection unit that detects a received electric power received by the wireless power receiving apparatus;
a control unit that generates a control signal for controlling a transmitted electric power to be transmitted from the wireless power transmission apparatus;
an abnormal state judgment unit that judges whether or not an abnormal state has occurred, based on the received electric power detected by the electric power detection unit and a past state of the wireless power receiving apparatus; and
a communication unit that transmits, to the wireless power transmission apparatus, the control signal and data that indicates a detection value of the received electric power,
wherein the abnormal state judgment unit is configured to judge, for every first period, whether or not an abnormal state is present,
and wherein the communication unit transmits data that indicates a detection value of the received electric power to the wireless power transmission apparatus for every second period, which is longer than the first period.

* * * * *